(12) United States Patent
Kanematsu

(10) Patent No.: US 11,733,948 B2
(45) Date of Patent: Aug. 22, 2023

(54) INFORMATION PROCESSING APPARATUS AND CONTROL METHOD FOR STORING AN OPERATION LOG

(71) Applicant: CANON KABUSHIKI KAISHA, Tokyo (JP)

(72) Inventor: Shinichi Kanematsu, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/686,005

(22) Filed: Nov. 15, 2019

(65) Prior Publication Data

US 2020/0174729 A1 Jun. 4, 2020

(30) Foreign Application Priority Data

Nov. 30, 2018 (JP) .................................. 2018-225478

(51) Int. Cl.
*G06F 3/12* (2006.01)

(52) U.S. Cl.
CPC ............ *G06F 3/1273* (2013.01); *G06F 3/121* (2013.01); *G06F 3/1238* (2013.01); *G06F 3/1293* (2013.01)

(58) Field of Classification Search
None
See application file for complete search history.

(56) References Cited

U.S. PATENT DOCUMENTS

| 6,930,803 | B1 * | 8/2005 | Suzuki | G06T 1/0021 358/448 |
| 8,248,648 | B2 * | 8/2012 | Yamauchi | H04N 1/00912 358/1.16 |
| 9,268,279 | B1 * | 2/2016 | Murayama | G03G 15/50 |
| 2007/0070451 | A1 * | 3/2007 | Kazama | H04N 1/00785 358/498 |
| 2007/0183282 | A1 * | 8/2007 | Oyabu | H02P 6/06 369/47.25 |
| 2007/0283293 | A1 * | 12/2007 | Nakamura | H04N 1/00233 715/811 |
| 2008/0074683 | A1 * | 3/2008 | Yanamura | H04N 1/32363 358/1.16 |
| 2008/0253786 | A1 * | 10/2008 | Isobe | G03G 15/0194 399/69 |
| 2011/0302352 | A1 * | 12/2011 | Lee | G11C 11/5628 711/E12.008 |
| 2012/0084546 | A1 * | 4/2012 | Ogasawara | G06F 9/442 713/2 |

(Continued)

FOREIGN PATENT DOCUMENTS

| JP | 2008262287 A | 10/2008 |
| JP | 2008-287423 A | 11/2008 |

(Continued)

*Primary Examiner* — Miya J Williams
*Assistant Examiner* — Pawan Dhingra
(74) *Attorney, Agent, or Firm* — Canon U.S.A., Inc. IP Division

(57) ABSTRACT

An information processing apparatus includes at least one controller configured to store first log information in a first storage area and store second log information in a second storage area upon occurrence of an event. The first log information is deleted to store log information about occurrence of a new event in the first storage area. The second log information is not deleted to store log information about occurrence of a new event in the second storage area.

17 Claims, 23 Drawing Sheets

(56) References Cited

U.S. PATENT DOCUMENTS

| | | | | |
|---|---|---|---|---|
| 2014/0355032 A1* | 12/2014 | Ito | ................. | G06K 15/408 |
| | | | | 358/1.14 |
| 2015/0015911 A1* | 1/2015 | Shimizu | ............. | H04N 1/00129 |
| | | | | 358/1.15 |
| 2015/0199000 A1* | 7/2015 | Kawaura | ............... | G06F 1/3234 |
| | | | | 713/323 |
| 2016/0224287 A1* | 8/2016 | Watanabe | ............. | G06F 3/1213 |
| 2016/0313921 A1* | 10/2016 | Kojima | ............... | G06F 12/0246 |
| 2016/0364184 A1* | 12/2016 | Nakatani | ............... | G06F 3/1258 |
| 2018/0024794 A1* | 1/2018 | Baba | .................... | G06F 3/1203 |
| | | | | 358/1.15 |
| 2018/0048785 A1* | 2/2018 | Shibata | ............. | H04N 1/00204 |
| 2018/0095693 A1* | 4/2018 | Kikkawa | ............... | G06F 3/0607 |
| 2018/0109116 A1* | 4/2018 | LaMarre | ................. | H02J 7/007 |
| 2018/0341773 A1* | 11/2018 | Khatri | .................. | G06F 21/602 |

FOREIGN PATENT DOCUMENTS

| | | | |
|---|---|---|---|
| JP | 2012054803 A | 3/2012 |
| JP | 2014-232353 A | 12/2014 |
| JP | 2015-172907 A | 10/2015 |

* cited by examiner

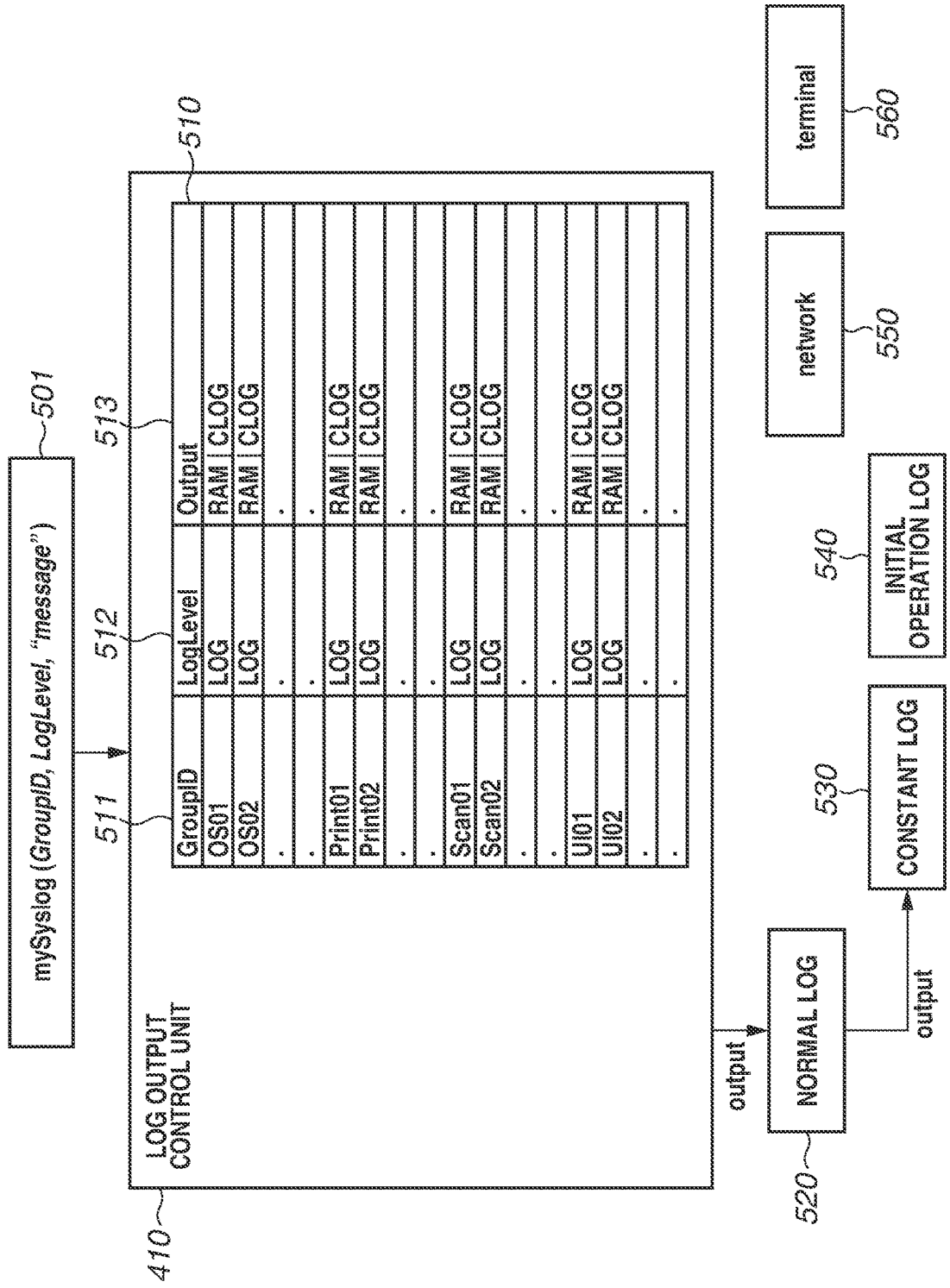

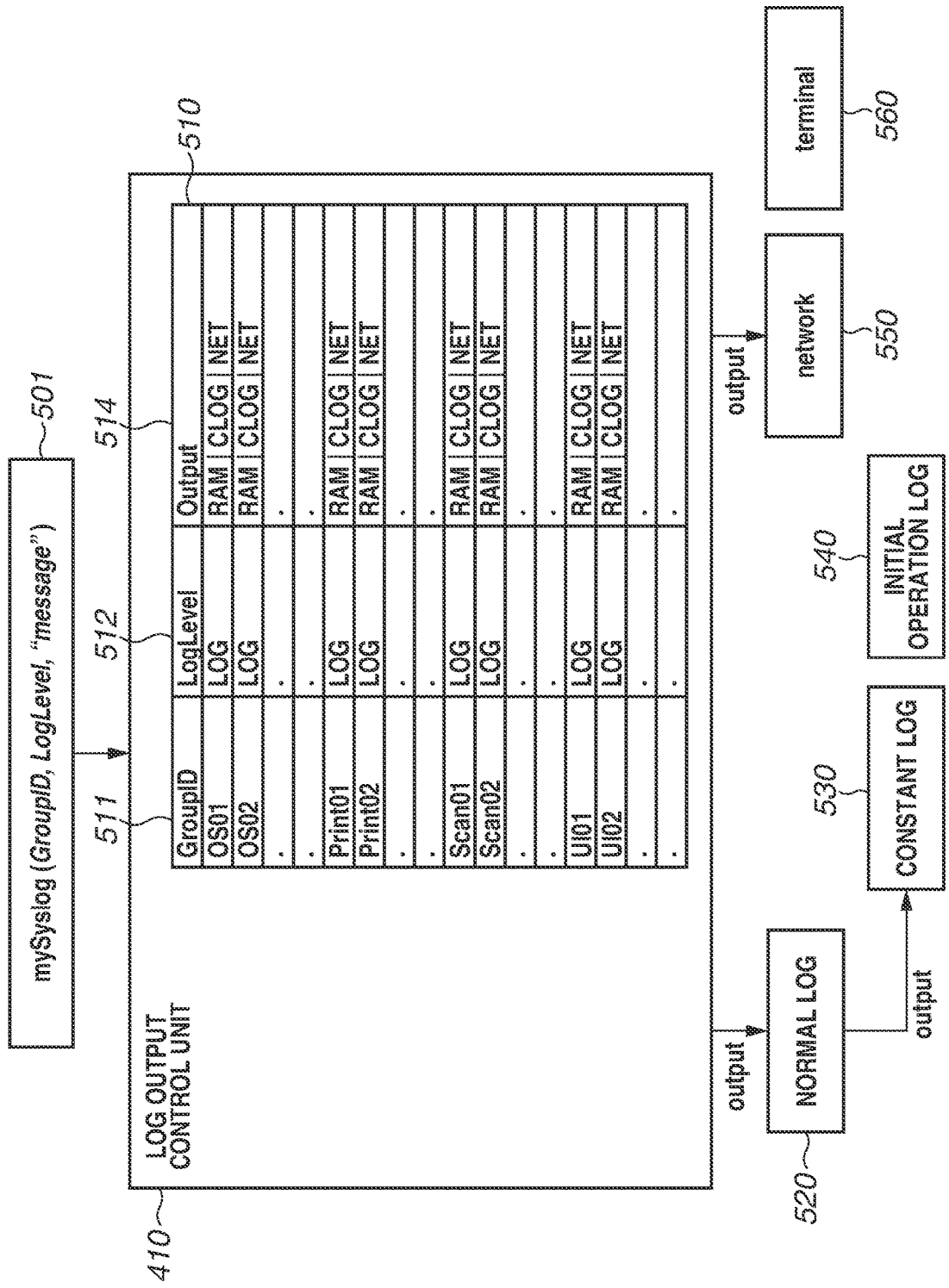

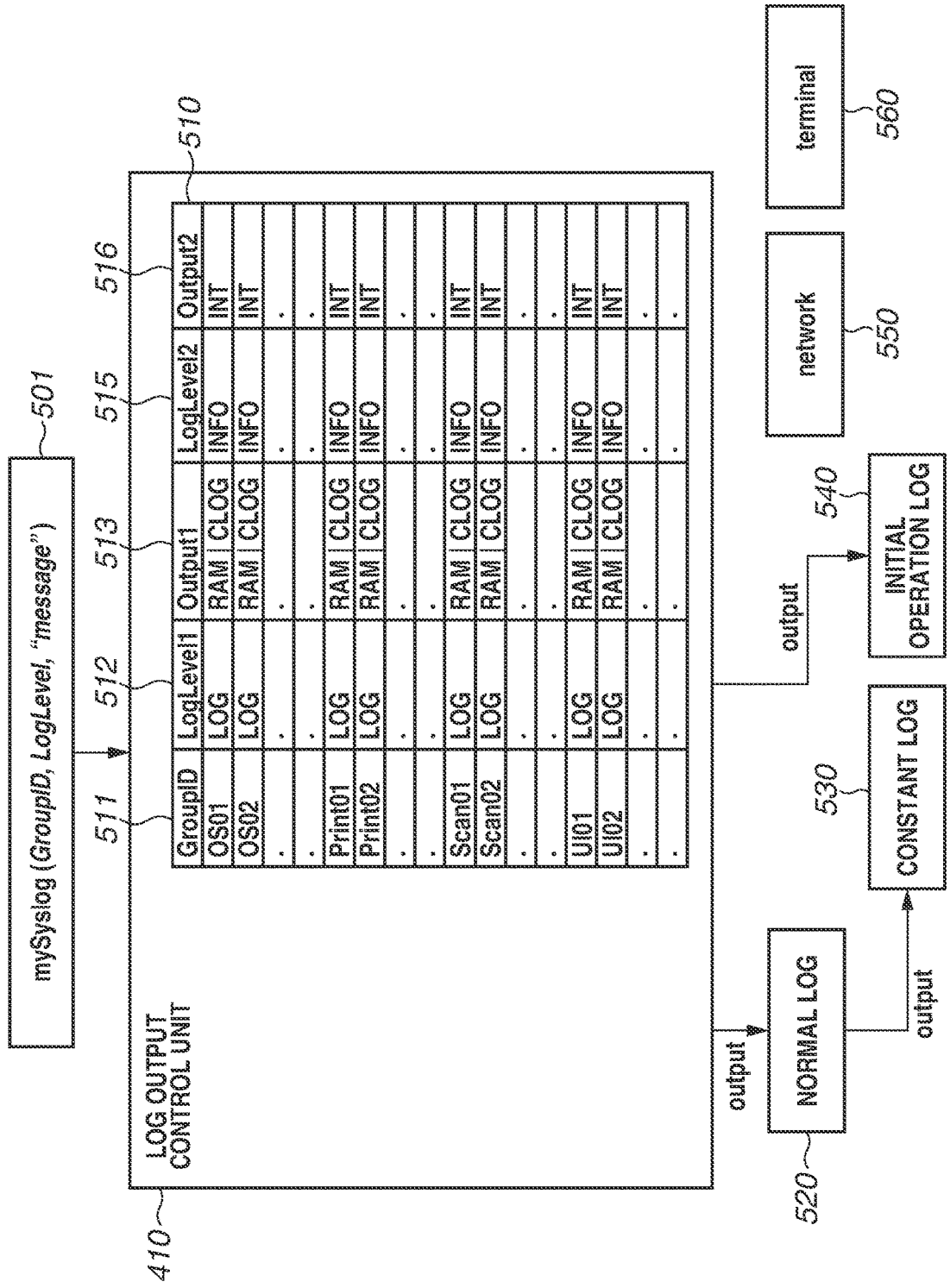

FIG.6

| LogLevel | VALUE | OUTPUT CONTENTS |
|---|---|---|
| INFO | 6 | DETAILED OPERATION WITHIN EACH SUB-MODULE OF FIRMWARE |
| LOG | 5 | INTER-MODULE OPERATION POINT IN NORMAL OPERATION |
| WARN | 4 | UNDESIRABLE OPERATION THOUGH NOT CAUSING ERROR STOP |
| ERR | 3 | OCCURRENCE OF ERROR IN SUB-MODULE |
| CRIT | 2 | OCCURRENCE OF ERROR IN ENTIRE SYSTEM, SYSTEM STOP |

| GroupID | VALUE | ALLOCATION |
|---|---|---|
| OS01 | 1 | FOR CS MODULE 1 |
| OS02 | 2 | FOR CS MODULE 2 |
| . | . | . |
| OS16 | 16 | . |
| Print01 | 17 | FOR PRINTER CONTROL UNIT 1 |
| Print02 | 18 | FOR PRINTER CONTROL UNIT 2 |
| . | . | . |
| . | . | . |
| Scan01 | 33 | FOR SCANNER CONTROL UNIT 1 |
| Scan02 | 34 | FOR SCANNER CONTROL UNIT 2 |
| . | . | . |
| . | . | . |
| UI01 | 49 | FOR UI CONTROL UNIT 1 |
| UI02 | 50 | FOR UI CONTROL UNIT 2 |
| . | . | . |
| . | . | . |

| Output | LOG TYPE | OUTPUT DEVICE |
|---|---|---|
| RAM | NORMAL LOG | DRAM |
| CLOG | CONSTANT LOG | HDD |
| NET | NETWORK | NETWORK |
| TERM | TERMINAL | DEBUG TERMINAL DEVICE |
| INITIAL | ARRIVAL LOG | HDD |

```
84910.468.356 :Print01    .LOG  :Initialize PortA start
84910.468.592 :Print01    .LOG  :malloc memory: 2400 byte
84910.468.711 :OS02       .LOG  :[mem] request 2400
84910.469.938 :OS02       .LOG  :[mem] [ok]alloced 2400
84910.470.094 :Print01    .LOG  :Initialize PortA end
```

FIG. 12B

```
84910.468.356 :Print01    .LOG  :Initialize PortA start
84910.468.370 :UI01       .INFO :UI-panel: HardKey pressed keyid [0x82]
84910.468.393 :Scan02     .INFO :DeviceStatus update Status[0x1000]
84910.468.592 :Print01    .LOG  :malloc memory: 2400 byte
84910.468.711 :OS02       .LOG  :[mem] request 2400
84910.468.780 :OS02       .INFO :memory pool: Area02 start address : 0x4df00c34
84910.468.799 :OS02       .INFO :memory pool: Area02 total          : 0x00000800
84910.468.820 :OS02       .INFO :memory pool: Area02 used           : 0x000007ad
84910.469.938 :OS02       .LOG  :[mem] [ok]alloced 2400
84910.470.094 :Print01    .LOG  :Initialize PortA end
```

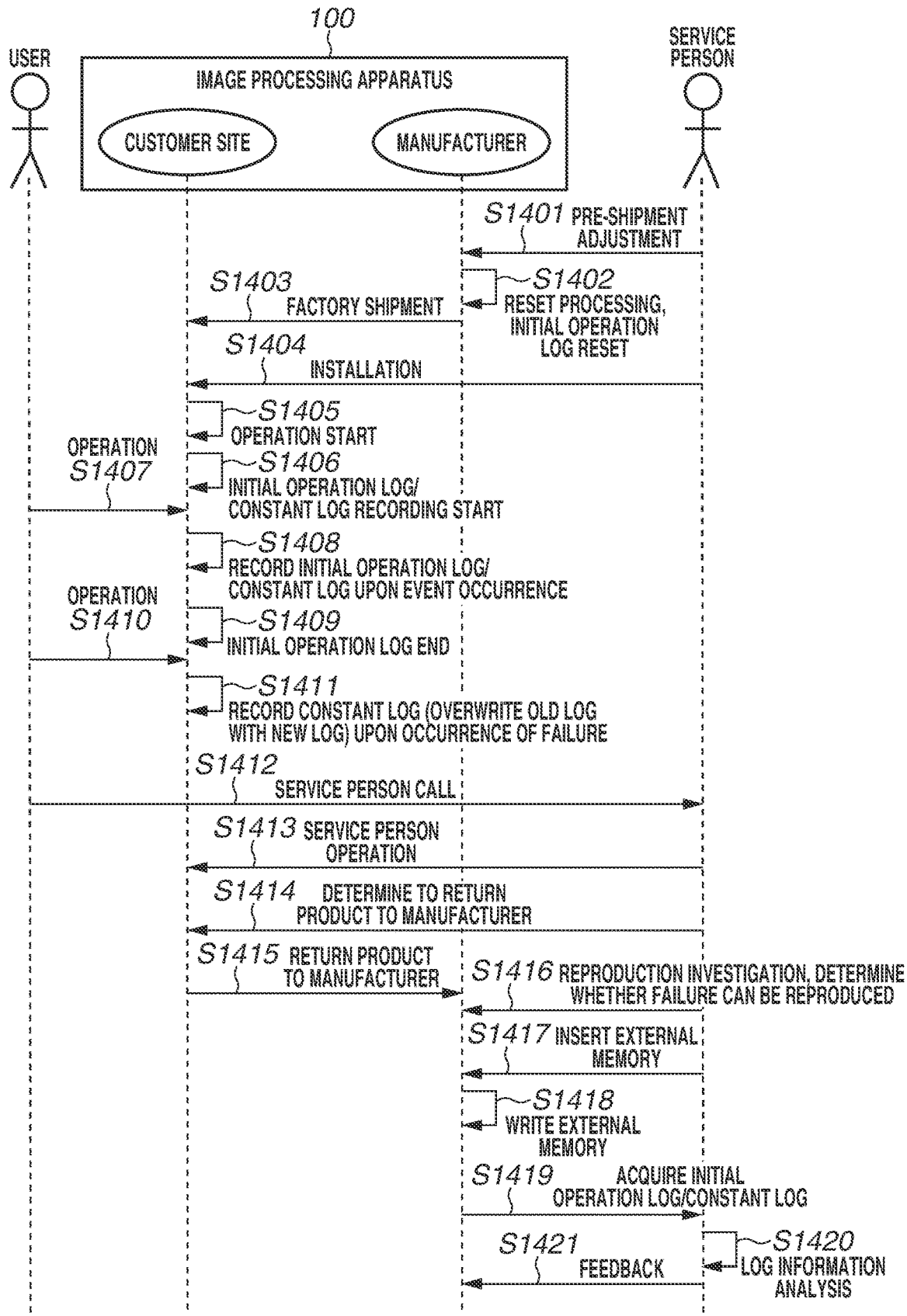

INFORMATION PROCESSING APPARATUS AND CONTROL METHOD FOR STORING AN OPERATION LOG

BACKGROUND

Field

The present disclosure relates to an information processing apparatus capable of storing an operation log. The information processing apparatus is used as, for example, a facsimile (FAX), a printer, a scanner, and a multi-function peripheral (MFP) including these functions.

Description of the Related Art

Product manufacturers that produce and sell information processing apparatuses, such as printers, have been put effort into minimizing occurrence of failures in products to improve the quality of products. However, it is difficult to completely eliminate failures in the products at customer sites which are mass-produced, shipped to different countries, and used under environments different from each other among customer sites. Under such circumstances, some products in which a failure occurs may be returned to the manufacturer.

To take a countermeasure immediately, the manufacturer identifies a cause of a failure in products returned to the manufacturer. Examples of information to be used for identifying a cause of a failure include product operation logs obtained before and after occurrence of the failure.

Japanese Patent Application Laid-Open No. 2014-232353 discusses an apparatus that sequentially overwrites old operation logs with new operation logs, to constantly store the latest operation log. In general, if a failure occurs in a product, the product is returned to its manufacturer relatively quickly. Accordingly, while there is a limited storage area for storing operation logs, the apparatus discussed in Japanese Patent Application Laid-Open No. 2014-232353 is more likely to be returned to its manufacturer in a state where operation logs obtained before and after occurrence of a failure are stored.

SUMMARY

As a result of researching the relationship between occurrence of a failure and operation logs, the present inventors have found that not only operation logs obtained before and after occurrence of a failure, but also operation logs obtained during a period immediately after a product is installed at a customer site (this type of an operation log is referred to as an initial operation log) is useful to identify a cause of a failure in products. For example, info ion about operation logs of control firmware and self-diagnosis results obtained during an initial operation is important to identify a cause of a failure. Therefore, it is beneficial for each information processing apparatus to store initial operation log until the information processing apparatus is returned to its manufacturer.

In contrast, the apparatus discussed in Japanese Patent Application Laid-Open No. 2014-232353 is configured to overwrite old log information with new log information. Accordingly, the apparatus discussed in Japanese Patent Application Laid-Open No. 2014-232353 cannot reliably store an initial operation log until the apparatus is returned to its manufacturer.

The present disclosure features providing an information processing apparatus capable of storing log information and storing log information obtained during an initial operation after the information processing apparatus is installed. In particular, the present disclosure features providing an information processing apparatus capable of storing both new log information and log information obtained during an initial operation.

According to an aspect of the present disclosure, an information processing apparatus includes at least one memory that stores a control program, and at least one controller configured to execute the control program to store first log information in a first storage area and store second log information in a second storage area upon occurrence of an event, wherein the first log information is deleted to store log information about occurrence of a new event in the first storage area, and wherein the second log information is not deleted to store log information about occurrence of a new event in the second storage area.

Further features of the present disclosure will become apparent from the following description of exemplary embodiments with reference to the attached drawings.

BRIEF DESCRIPTION OF THE DRAWINGS

FIG. 5A is a diagram illustrating a relationship between a log output function in a normal mode and a log output destination. FIG. 5B is a diagram illustrating a relationship between a log output function in a network output mode and a log output destination. FIG. 5C is a diagram illustrating a log output function in an initial operation log output mode and a log output destination.

FIG. 6 is a diagram illustrating definitions of each log output level.

FIG. 7 is a diagram illustrating definitions of each group identification (ID).

FIG. 8 is a diagram illustrating definitions of each output destination of a log output.

FIGS. 12A and 12B are diagrams each illustrating an example of a normal log output.

FIG. 14 is a diagram illustrating a system utilization sequence.

DESCRIPTION OF THE EMBODIMENTS

Figure 1:
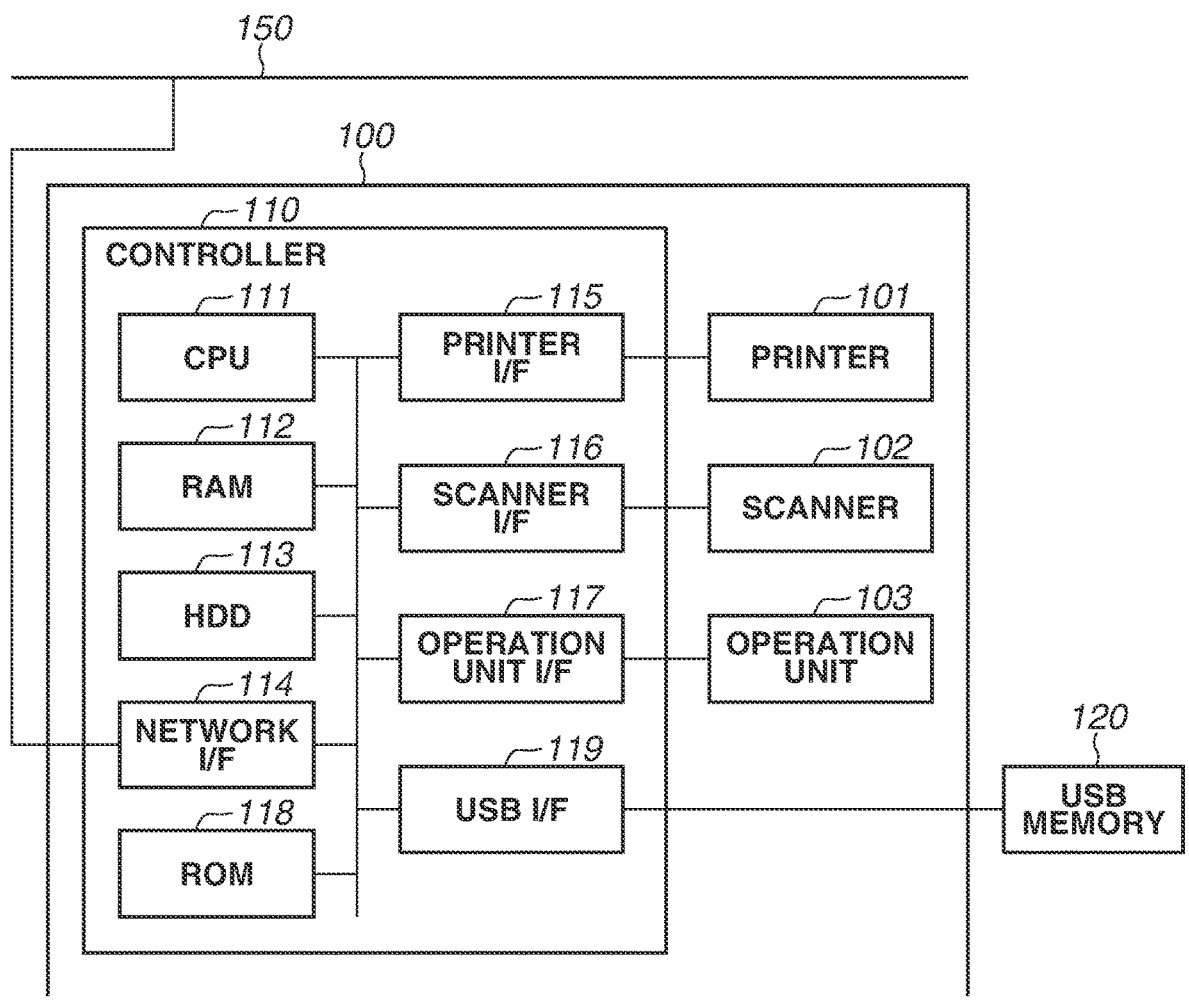
FIG. 1 is a block diagram illustrating a configuration example of an image processing apparatus.

Modes for carrying out the present disclosure will be described in detail below with reference to the accompanying drawings based on exemplary embodiments. The modes for carrying out the present disclosure are not limited only to configurations described in the following exemplary embodiments. Some of components in the following exemplary embodiments may be omitted, or some or all of the components in the following exemplary embodiments may be replaced with equivalents which achieve similar advantageous effects.

<System>

First, a use case of a system according to a first exemplary embodiment will be described. This system is related to processes from shipment of an image processing apparatus 100 to returning of the image processing apparatus 100 to a manufacturer. FIG. 14 is a sequence diagram illustrating system utilization. In the following description, each step is denoted by "S".

At shipping of the image processing apparatus 100, in step S1401, an inspection and pre-shipment adjustment are first performed by a service person in a manufacturer's factory. At this stage, no failure occurs in the image processing apparatus 100. After the pre-shipment adjustment, in step S1402, the image processing apparatus 100 performs reset processing. In the reset processing, an initial operation log to be described below, as well as a print count value counted up in test printing or the like during the pre-shipment adjustment, a system setting, an authentication setting, a network setting, and the like are reset. In step S1403, the image processing apparatus 100 subjected to the reset processing is shipped to a customer site. In step S1404, installation processing is performed by the service person. When the image processing apparatus 100 is normally installed, in step S1405, the image processing apparatus 100 is powered on and starts operation. Upon first operation after the reset processing after shipment), in step S1406, initial operation log/constant log storing processing is started. After that, in step S1407, various operations are performed by a user. Then, in step 1408, log information is added to each of the initial operation log and a constant log upon occurrence of an event. In step S1409, after a certain number of logs are stored, initial operation log storing processing is stopped. Then, in step S1410, various operations are performed by the user. In this example case, a failure occurs in the image processing apparatus 100. Since the initial operation log storing processing is stopped, in step S1411, log information obtained upon occurrence of a failure is stored as the constant log to be described below. In this process, an old log is deleted and a new log is stored as the constant log. Then, in step S1412, the user who has noticed the failure makes a service person call. In step S1413, the service person who has received the service person call goes to the customer site to conduct an initial investigation. The failure may be solved by the initial investigation in some cases. However, in this example case, in step S1414, the service person determines that the image processing apparatus 100 is returned to the manufacturer. In step S1415, the image processing apparatus 100 is returned to the manufacturer from the customer site, and then, in step S1416, the service person first verifies whether the failure pointed out by the user can be reproduced. Verifying whether the failure is reproduced is a particularly efficient investigation method. If a phenomenon that has occurred at the customer site is reproduced, the cause of the failure can be identified in most cases. In this example case, it is determined that the phenomenon cannot be reproduced. Next, in step S1417, the service person connects an external memory to the image processing apparatus 100 and performs a log information collection procedure. Upon receiving a log information write instruction from the service person, in step S1418, the image processing apparatus 100 writes the initial operation log and the constant log into the external memory. In step S1419, the service person collects the external memory to acquire log information. In step S1420, an analysis is conducted based on the acquired log information to detect information useful for identifying the cause of the failure that has occurred at the customer site. After the cause of the failure is identified, a feedback procedure for taking a countermeasure against the failure is performed on the image processing apparatus 100. The present exemplary embodiment illustrates a configuration for implementing the above-described sequence.

<Image Processing Apparatus>

FIG. 1 is a block diagram illustrating a configuration example of the image processing apparatus 100. The image processing apparatus 100 is an information processing apparatus, such as a multi-function peripheral (MFP), including a printer 101, a scanner 102, an operation unit 103, and a controller 110. Each unit includes a central processing unit (CPU), a read-only memory (ROM), and a random access memory (RAM). The CPU included in each unit executes firmware stored in the ROM of the corresponding unit, to implement functional operations of each unit. Each of the CPU, the ROM, and the RAM is a minimum configuration for functioning as a controller (control unit). Various processing circuits and processing chips are mounted in addition to the CPU, the ROM, and the RAM.

The image processing apparatus 100 can communicate with an external apparatus (a personal computer (PC), a server, etc.) via a network 150 (local area network (LAN) 150). When an external medium, such as a universal serial bus (USB) memory 120, is connected to the image processing apparatus 100, information stored in the image processing apparatus 100 can be written into the external medium.

The printer 101 is a print device for forming an image on a sheet. The printer 101 may be an electrophotographic device or an inkjet device.

Figure 3:
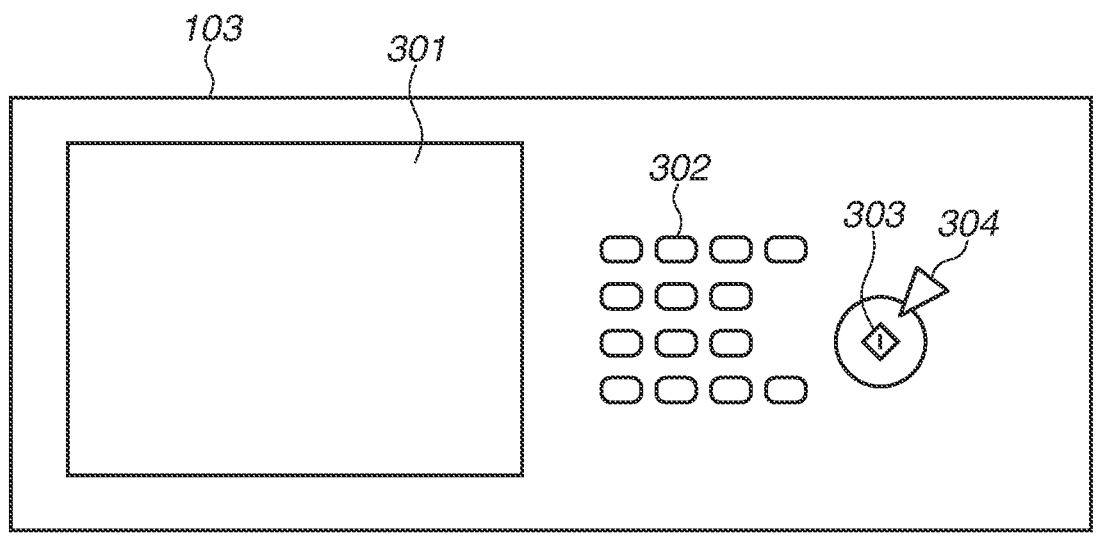
FIG. 3 is a diagram illustrating a configuration example of an operation unit.

The scanner 102 is a scan device for scanning a document and generating an image. The operation unit 103 serves as a notification unit (display unit) that notifies user information, and also serves as a user interface (a reception unit or an input unit) that receives an instruction from the user. As illustrated in FIG. 3, the operation unit 103 includes a liquid crystal panel 301 and various hardware keys such as a numeric keypad 302, a start key 303, and a stop key 304. The operation unit 103 notifies user information using the liquid crystal panel 301. Further, the operation unit 103 receives an input of a user instruction via the above-described hardware keys and a touch sensor (not illustrated) which is provided on the liquid crystal panel 301. FIG. 3 illustrates a configuration example of the operation unit 103. The liquid crystal panel 301 receives a user touch operation, transmits the received user touch operation as an operation signal to the controller 110, receives a user interface (UI) display output from a controller farm, and displays the output on a liquid crystal screen. The numeric keypad 302 receives a numeric input instruction. The start key 303 receives an operation start instruction for the image processing apparatus 100. The stop key 304 receives an operation stop instruction for the image processing apparatus 100.

The controller 110 is a control unit that controls the units, which are included in the image processing apparatus 100, in an integrated manner as a system. The controller 110 includes a CPU 111, a RAM 112, a ROM 118, which is a nonvolatile memory (nonvolatile storage medium), a hard disk drive (HDD) 113, and various interfaces. The CPU 111 reads a controller farm stored in the ROM 118 and executes the read controller farm, to control and communicate with each of the units. The CPU 111 transmits and receives image data to and from, for example, the scanner 102 and the printer 101. Further, the CPU 111 performs processing on an operation instruction received from the user via the operation unit 103, and controls the operation unit 103 to display a status of each unit. A printer interface (I/F) 115, a scanner I/F 116, and an operation unit I/F 117 are interfaces for establishing a communication between the controller 110 and each unit. A USB 119 is an interface for writing data into the USB memory 120 and reading data from the USB memory 120. The ROM 118 includes the controller farm. The controller farm will be described in detail below.

<Storage Area>

Figure 2:
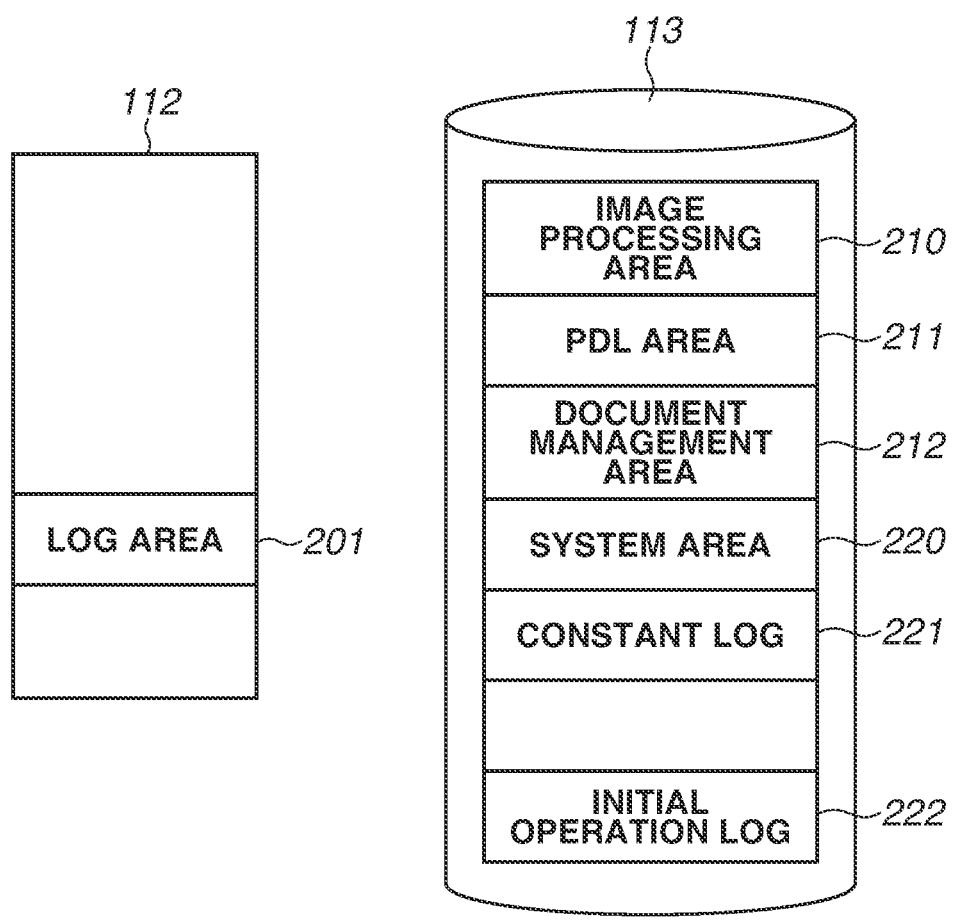
FIG. 2 is a diagram illustrating a storage area allocation configuration.

FIG. 2 illustrates a storage area allocation configuration. As illustrated in FIG. 2, the image processing apparatus 100 includes a plurality of storage areas, such as the RAM 112 and the HDD 113, in which information can be stored (recorded). In the RAM 112, a log area 201 is allocated with a fixed size and a normal log can be stored. The normal log is controlled using the log area 201 as a ring buffer, and the operation log of controller control firmware is constantly recorded during the operation of the image processing apparatus 100. In the HDD 113, a storage area for implementing various functions mounted on the image processing apparatus 100 is secured. The storage area is preliminarily allocated for each function. The HDD 113 may be replaced with a solid state drive (SSD), as long as a large capacity of data can be stored.

An image processing area 210, a page description language (PDL) area 211, and a document management area 212 are image data storage areas to be used for each function. A system area 220 is used as a work area for the controller farm to operate and is also used as an area for storing system management data. In the system area 220, a constant log area 221 and an initial operation log area 222 are allocated.

<Software Configuration>

Figure 4:
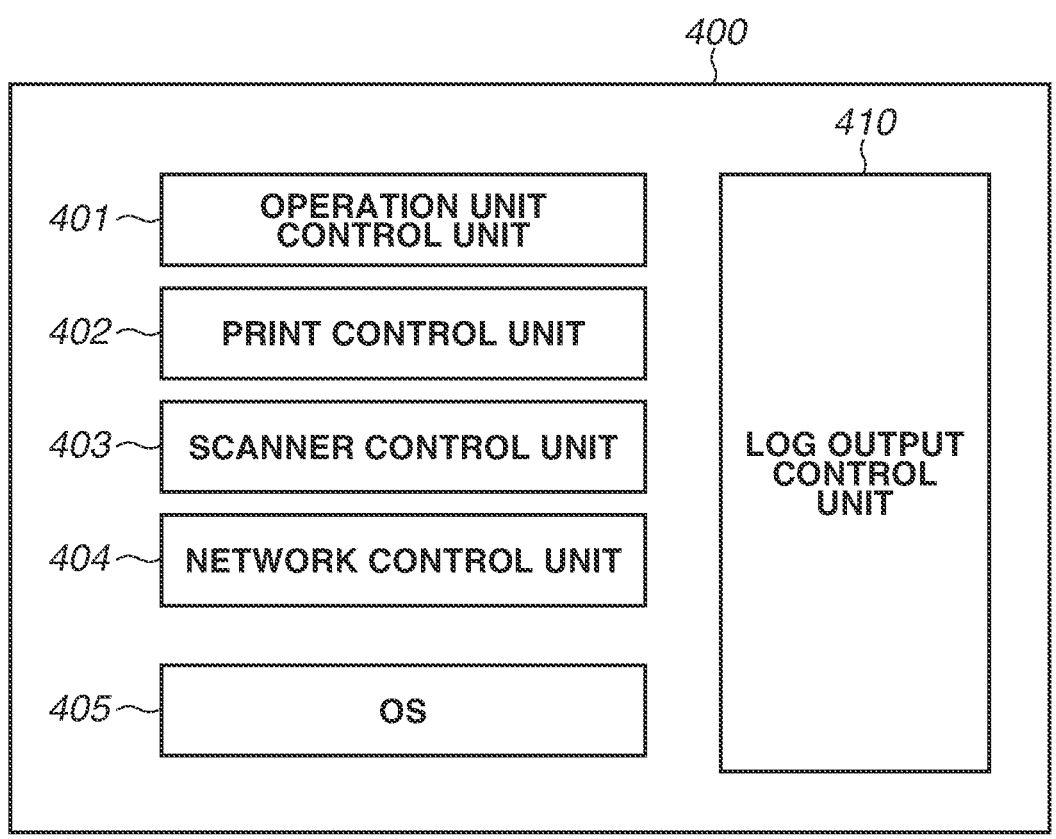
FIG. 4 is a diagram illustrating a configuration example of firmware.

FIG. 4 is a diagram illustrating a configuration example of firmware. A controller farm 400 is written in the ROM 118. After the image processing apparatus 100 is started, the controller farm 400 is read from the ROM 118 and loaded into the system area of each of the RAM 112 and the HDD 113. Then, the CPU 111 executes the controller farm 400, to implement each function to be described below. An operation unit control unit 401 receives a screen display from the operation unit 103 and inputs from the hardware keys and the touch sensor, and executes corresponding processing. A print control unit 402 controls the printer 101. A scanner control unit 403 controls the scanner 102. A network control unit 404 controls a network I/F 114 and communicates with an external device connected to the image processing apparatus 100 via the network 150. An operating system (OS) module 405 is a module that provides basic system functions for the controller 110. A log output control unit 410 is a module that controls an operation log output from the controller farm 400 and executes log recording. The log output control unit 410 also controls the normal log, the constant log, and the initial operation log.

<Constant Log>

The normal log and the constant log, which are output by the log output control unit 410, will be described with reference to FIGS. 5A, 5B, 6, 7, 8, and 15B.

FIG. 5A is a diagram illustrating the log output control unit 410 and configurations of various logs output by the log output control unit 410. A normal log 520 is a log to be continuously output to the RAM 112 by the log output control unit 410 during the operation of the controller farm 400. The log output control unit 410 treats the image processing area 210 in the RAM 112 as a ring buffer. In the present exemplary embodiment, an area of 1 MB is allocated as the log area 201 for the normal log. Log data can be written into the RAM 112 at a high speed. However, since the RAM 112 is a volatile memory, the data stored in the RAM 112 disappears after energization is stopped. Accordingly, it is difficult to use the normal log for an investigation to be conducted after the image processing apparatus 100 is returned to the manufacturer. For this reason, a constant log 530 is recorded as nonvolatile data to prevent the data from disappearing after energization is stopped.

The constant log 530 is a log that is copied and written into the HDD 113 when a certain number of normal logs 520 are accumulated. The constant log 530 according to the present exemplary embodiment is written as a 1 MB file in the constant log area 221 of the HDD 113 every time the normal log 520 corresponding to 1 MB is written. In the constant log area 221, an area of 800 files can be allocated at maximum as the constant log and 800 MB can be allocated at maximum.

Each log is output in such a manner that each firmware module of the controller farm 400 calls a log output I/F 501, which is provided by the log output control unit 410, from the inside of each module. The log output I/F 501 includes three types of parameters, i.e., GroupID (first argument) indicating a log output source module, LogLevel (second argument) and a message (third argument) which is any message buried by a firmware developer. The log output control unit 410 stores a log output setting table 510, and performs subsequent log output processing based on settings in the log output setting table 510. FIG. 7 is a table illustrating a definition example of GroupID allocation according to the present exemplary embodiment. A GroupID field 701 stores IDs for each module as the first argument of the log output I/F 501. An ID value field 702 stores values allocated to each GroupID. An allocation field 703 stores objects to which each GroupID is allocated. FIG. 7 illustrates a state where 16 IDs are allocated to the OS module 405 as GroupID in order from "OS01". FIG. 7 also illustrates a state where 16 IDs are allocated to the operation unit control unit 401, which is associated with the function of the operation unit, in order from "UI01". FIG. 7 also illustrates a state where 16 IDs are allocated to the print control unit 402, which is associated with the print function, in order from "Print01". FIG. 7 also illustrates a state where 16 IDs are allocated to the scanner control unit 403, which is associated with the scanner function, in order from "Scan01".

Each GroupID is output as a character string in a log, like in normal log output examples illustrated in FIGS. 12A and 12B. FIG. 6 is a table illustrating definitions of each Log-Level, which is the second argument of the log output I/F 501, and the meaning of each LogLevel. A LogLevel field 601 stores definition names of each LogLevel.

A value field 602 stores values corresponding to the LogLevel field 601. An output contents field 603 stores explanation information corresponding to the LogLevel field 601. The log output control unit 410 performs control as to whether to finally output a log for each GroupID based on the settings in the log output setting table 510.

FIG. 5A illustrates a normal state of a log output setting according to the present exemplary embodiment. In the log output setting table 510 illustrated in FIG. 5A, "LOG" is defined for all GroupIDs. Accordingly, when this table is used, event information of any one of "LOG", "WARN", "ERR", and "CRIT" types, which have the same second argument of the log output I/F 501 or a higher priority, is set as a log output target. Calling of the log output I/F 501 at the "INTO" level is excluded from the log output target. A log at the "INFO" level is information about a general operation output in a module. A log at the "LOG" level is information to be used for recognizing, for example, a device start-up complete timing and a job generation/end timing. A log at the "WARN" level is information to be used for recognizing, for example, a timing when a job setting is rounded and operated and a timing when a user authentication error occurs. A log at the "ERR" level is information to be used for recognizing, for example, an occurrence timing of a sequence error, communication timeout, or a fallback operation (e.g., a print operation to be performed at a reduced process speed). A log at the "CRIT" level is information to be used for recognizing, for example, an occurrence timing of a device start-up failure, an inter-process communication failure, a memory securing/releasing failure, a system library error, or an error in hardware such as a RAM or HDD. A log at the "INFO" level is information to be used for recognizing, for example, a timing of an operation that is more detailed than the above-described information, such as a processing procedure in a module.

FIG. 8 is a table illustrating definitions of each log output destination. In FIG. 8, "RAM" represents a normal log, "CLOG" represents a constant log, "NET" represents a network transfer, "TERM" represents a terminal apparatus, and "INITIAL" represents an initial operation log. In FIG. 5A, "RAM" and "CLOG" are set in a log output destination field 513 which is associated with each GroupID. Accordingly, log information in each item is output to each of the normal log "RAM" and the constant log "CLOG".

The log output setting table 510 is configured to be changeable by a log output setting change unit provided by the log output control unit 410. In the case of changing the log output setting table 510, the service person operates the operation unit 103 to display a log output setting change screen (not illustrated) to make an instruction. For example, when a log output level field 512 is changed to "ERR", only the logs at the "ERR" and "CRIT" levels, which have the same or higher priority, are subsequently output. When the log output level field 512 is changed to "INFO", logs at all levels of "INFO", "LOG", "WARN", "ERR", and "CRIT" are output because the "INFO" level has a lowest priority. As illustrated in FIG. 5A, the log output setting table 510 is configured such that a log output level and an output destination can be set for each GroupID and a control operation for the log output can be changed in each firmware module. The log output control unit 410 can change not only the log output destination, but also the log output destination. FIG. 5B illustrates an example where "NET" is added to the log output destination by the log output setting change unit. Referring to FIG. 5B, "NET" is added to "Output" in a log output destination field 514, in addition to "RAM" and "CLOG" which are set in default settings. Accordingly, a log output to a network 550 is also performed in addition to the output of the normal log 520 and the constant log 530.

Figure 15A:
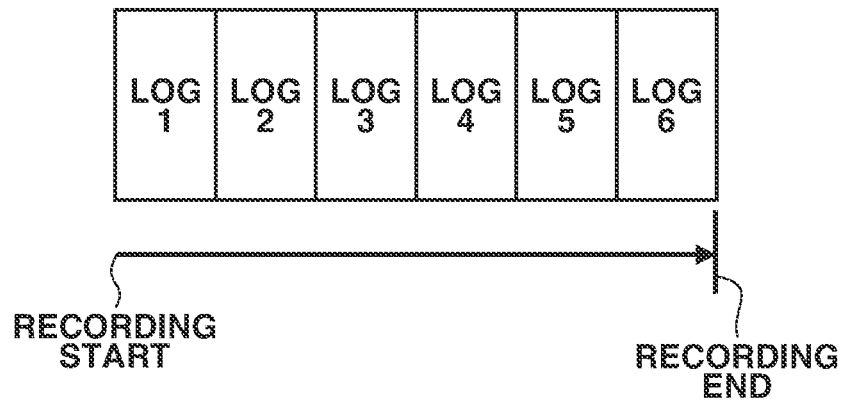
FIG. 15A is a diagram illustrating a method for recording an initial operation log.
Figure 15B:
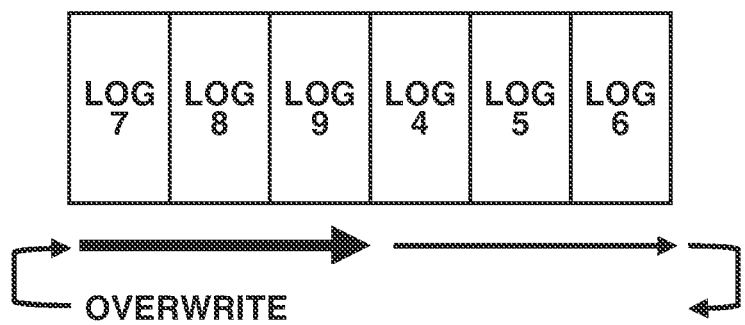
FIG. 15B is a diagram illustrating a method for recording a constant log.

The log output control unit 410 writes the constant log 530 by using the constant log area 221 as a ring buffer, like the log area 201. For example, as illustrated in FIG. 15B, the log output control unit 410 starts overwriting from the head of the constant log area 221 after completion of writing of logs 1 to 6. In an example illustrated in FIG. 15B, logs 1 to 3 are overwritten with logs 7 to 9, respectively.

<Initial Operation Log>

Next, an initial operation log 540 will be described with reference to FIGS. 5C, 9, 10, 15A, 15B, and 15C. Flowcharts of FIGS. 9 and 10 each illustrate processing to be implemented in such a manner that the CPU 111 executes the controller farm 400.

The initial operation log 540 is log information to be recorded separately from the normal log 520 and the constant log 530. The initial operation log 540 corresponding to 1 GB can be recorded on the initial operation log area 222. The initial operation log 540 is used as information for identifying the cause of the failure in a final decision, for example, when the cause cannot be identified in a simple check operation performed by the service person at the customer site or in a reproduction investigation or the like at a factory after occurrence of the product failure. In particular, the initial operation log 540 is configured to record, in a centralized manner, statuses obtained immediately after the installation at the customer site. For this reason, storing detailed information in the initial operation log 540 is useful. Accordingly, in the present exemplary embodiment, the log output level used when the initial operation log 540 is output is set to "INFO". As a result, log information at "INFO", "LOG", "WARN", "ERR" and "CRIT" levels is recorded as the initial operation log 540.

FIG. 5C illustrates a relationship between a log output function (initial operation log output mode) and a log output destination. As illustrated in FIG. 5C, the log output setting table 510 includes a log output level field 515 and a log output destination field 516, in addition to the log output level field 512 and the log output destination field 513 which are described above with reference to FIG. 5A. This configuration enables recording of a log on the output destination in the log output destination field 516 based on the setting in the log output level field 515, separately from recording of a log on the output destination in the log output destination field 513 based on the setting in the log output level field 512. As a result, a log is recorded on the output destination in the log output destination field 513 based on a determination condition in the log output level field 512. Meanwhile, a log is recorded on the output destination in the log output destination field 516 based on a determination condition in the log output level field 515, regardless of the determination condition in the log output level field 512.

FIG. 5C illustrates an example where "INFO" is stored in the log output level field 515 and "INIT" indicating the initial operation log is stored in the log output destination field 516 for all items. "INIT" is an abbreviation for "INITIAL". Accordingly, information that is more detailed than information stored in the normal log 520 and the constant log 530 is stored in the initial operation log 540. In other words, the number (information amount) of logs to be stored as the initial operation log 540 during a certain period tends to be greater than that of the normal log 520 and the constant log 530.

FIGS. 12A and 12B each illustrate differences between the log output contents of the constant log 530 and the initial operation log 540. FIG. 12A illustrates log output contents ("LOG" level), FIG. 12B illustrates log output contents ("INFO" level). The log output level of the initial operation log 540 is "INFO", and the log output level of the constant log 530 is "LOG". Accordingly, if an event (predetermined event) at the "INFO" level occurs, a log that is recorded as the initial operation log 540 but is not recorded as the constant log 530 is generated. Therefore, the number of items to be recorded on the initial operation log 540 during a certain operation period tends to be greater than the number of items to be recorded on the constant log 53 during the certain operation period. Each italic log at the "INFO" level illustrated in FIG. 12B is output in addition to the logs output during a normal period illustrated in FIG. 12A, so that the operation can be recognized in more detail. Values, such as "84910.468.356", in FIGS. 12A and 12B indicate information (time information) about time. Accordingly, a temporal relationship between recorded logs can be recognized by comparing the values. For example, "84910.468.592" is greater than "84910.468.356", which indicates that an event indicated by "84910.468.592" has occurred after another event indicated by "84910.468.356".

The log output control unit 410 does not use the initial operation log area 222 as a ring buffer, unlike the log area 201 and the constant log area 221. Accordingly, write processing as illustrated in FIG. 15A is performed. Specifically, the logs 1 to 6 are sequentially recorded from a recording start point, and when the initial operation log area 222 is occupied by a predetermined amount of data (e.g., when there is no free space, or when a storage full state is detected), recording is stopped. Thus, since the subsequent recording is stopped, log information obtained after the image processing apparatus 100 is installed can be maintained in storage instead of being deleted.

<Log Recording Flow>

Figure 9:
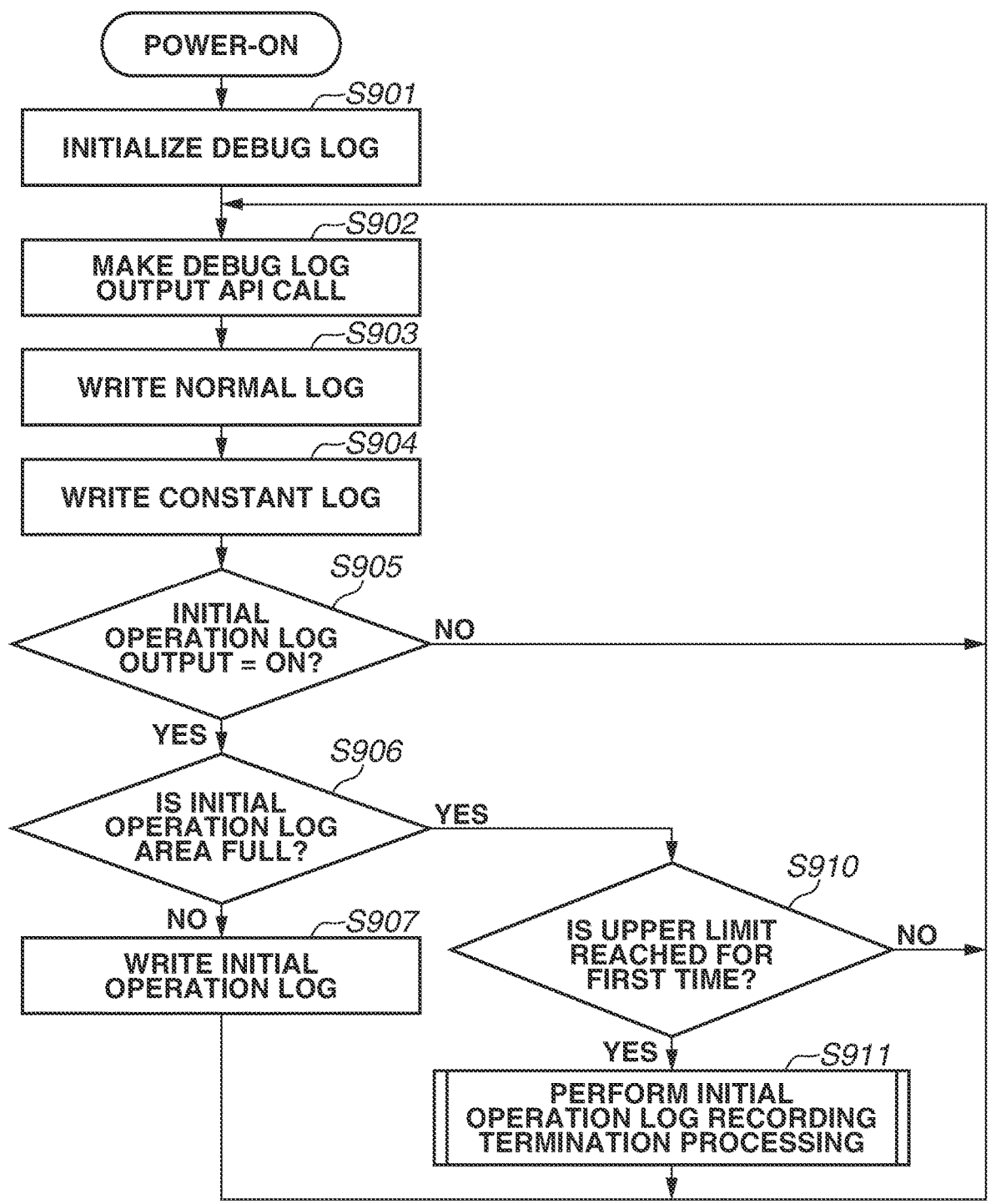
FIG. 9 is a flowchart illustrating log output processing.

A case where the setting illustrated in FIG. 5C is made as a factory default setting when the image processing apparatus 100 starts operation at the customer site will be described. FIG. 9 is a flowchart illustrating log output processing. The processing flow illustrated in FIG. 9 is implemented by the controller 110 loading a program stored in the ROM 118 into the RAM 112 and by the CPU 111 executing the loaded program.

When the image processing apparatus 100 is powered on, the controller 110 initializes the entire apparatus including the controller 110. Along with the initialization, in step S901, the controller 110 initializes the log output control unit 410 and makes a setup for the log output setting illustrated in FIG. 5C. In step S902, the controller 110 calls the log output I/F 501 from each farm module in accordance with the operation of the controller farm 400. As illustrated in FIG. 5C, "LOG" is set in the log output level field 512 and "RAM" and "CLOG" are set in the log output destination field 513. Meanwhile, "INFO" is set in the log output level field 515 and "INIT" is set in the log output destination field 516. In step S903, the log output control unit 410 to be executed by the controller 110 writes the normal log 520 based on the setting. In step S904, the log output control unit 410 writes the constant log. In step S905, the log output control unit 410 reads an initial operation log write setting in the log output setting table 510, and determines whether to output the initial operation log. "INIT" is stored in the log output destination field 516 illustrated in FIG. 5C. Specifically, since the initial operation log output is ON (YES in step S905), the processing proceeds to step S906. In step S906, the log output control unit 410 determines whether the initial operation log area 222 has reached a write size upper limit.

Since, in the present exemplary embodiment, the size of the initial operation log area 222 is 1 GB, determination of whether the size of the written log has exceeded 1 GB is performed. In a case where the size of the written log has not reached the upper limit (NO in step S906), the processing proceeds to step S907. In step S907, the controller 110 writes the initial operation log, and then the processing returns to step S902 to perform subsequent log recording processing. In a case where the initial operation log area 222 has reached the initial operation log write upper limit in step S906 (YES in step S907), the processing proceeds to step S910. In step S910, the controller 110 determines whether a first initial operation log write upper limit after shipment is reached. Information which indicates whether the initial operation log write upper limit is already reached and which is used for determination in step S910 is recorded as a write upper limit arrival flag in the system area 220 of the HDD 113. This flag is OFF before shipment. In a case where the initial operation log write upper limit flag is OFF in step S910 (YES in step S910), it is determined that the upper limit is reached for the first time. Then, the processing proceeds to step S911 to perform initial operation log recording termination processing. In step S911, the following processing is performed and flag information is recorded on the system area 220 of the HDD 113.

1. An initial operation log upper limit arrival flag is updated to ON and the flag is written into the system area 220.
2. "INIT" is deleted from the log output destination field 516 in the log output setting table 510.

The controller 110 executes the processing in step S911, and then the processing returns to step S902 to perform subsequent log output processing. When the initial operation log 540 reaches the recording upper limit and the processing in step S911 is performed, the setting in the log output setting table 510 is in the same state as the setting illustrated in FIG. 5A. Accordingly, in the subsequent log output processing, it is determined in step S905 that the initial operation log output is OFF. In other words, no writing operation is subsequently performed on the initial operation log area 222. Accordingly, the log written in the initial operation log area 222 of the HDD 113 is not overwritten after that and the initial operation log 540 corresponding to 1 GB is stored.

In the present exemplary embodiment, the log output level of the initial operation log 540 is set separately from the log output level of each of the normal log 520 and the constant log 530 so that the initial operation log 540 is recorded at the "INFO" level. However, any other method with which the initial operation log 540 can be recorded at the "INFO" level may be used. For example, the log output levels "RAM", "CLOG", and "INIT" may be standardized and the log output level may be set to "INFO" until recording of the initial operation log 540 is completed (storage full state). After completion of recording of the initial operation log 540, the log output level may be changed to "LOG". With this method, detailed recording of the initial operation log 540 can be performed at the "INFO" level. Since, the log output level is set to "LOG" after completion of recording of the initial operation log 540, processing cost for recording the normal log 520 can be reduced. Further, since the amount of information to be recorded per unit time can be reduced, the constant log 530 can be stored in a relatively long period if the same constant log area 221 is used.

<Collection Flow>

Figure 10:
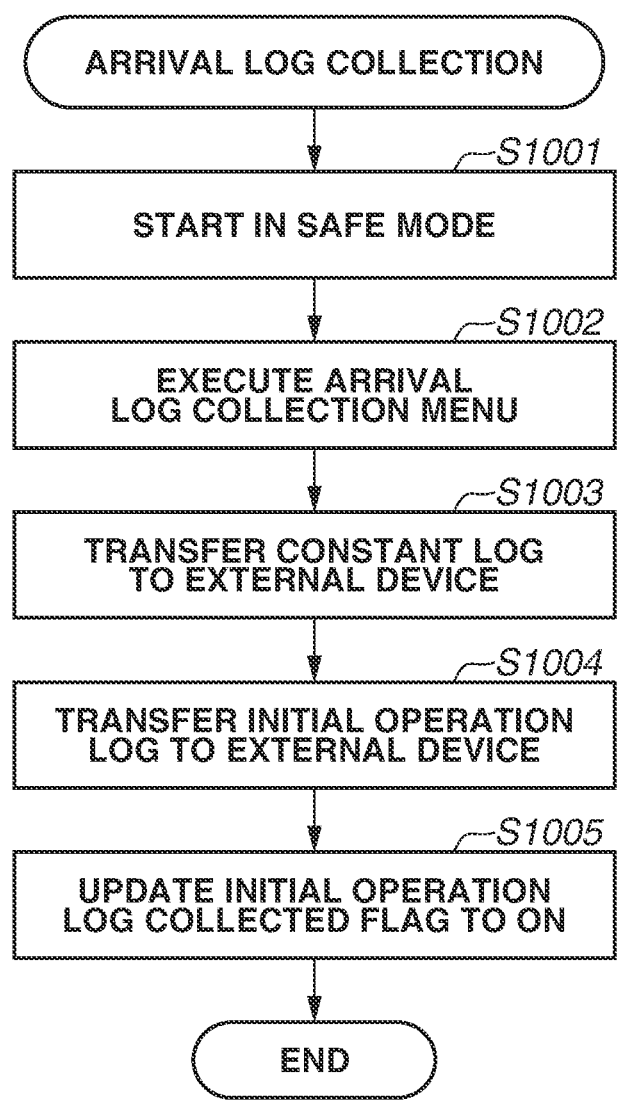
FIG. 10 is a flowchart illustrating log collection processing.
Figure 11:
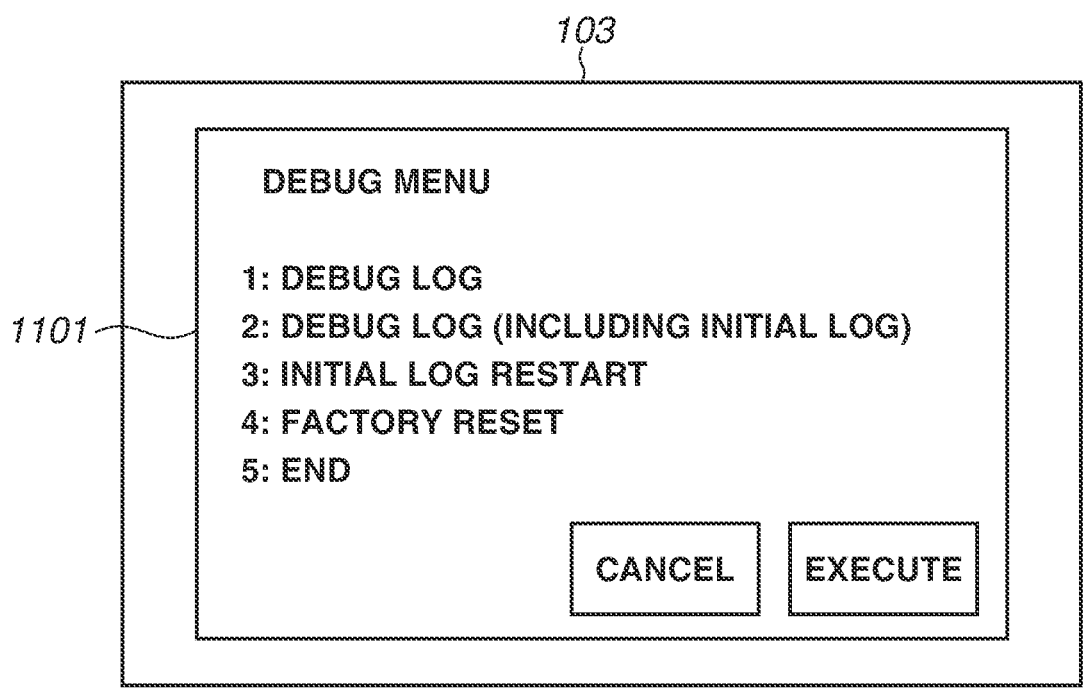
FIG. 11 is a diagram illustrating a user interface (UI) screen to be displayed during log collection processing.

Log collection processing will be described with reference to FIGS. 10 and 11. A processing flow illustrated in FIG. 10 is implemented by the controller 110 loading a program stored in the ROM 118 into the RAM 112 and by the CPU 111 executing the loaded program.

In the case of collecting logs from the image processing apparatus 100, in step S1001, the service person starts the image processing apparatus 100 in a maintenance mode (safe mode). Then, the service person connects an external storage device such as the USB memory 120 or a notebook PC. After that, the service person causes the operation unit 103 to display a debug screen 1101. FIG. 11 illustrates a UI screen to be displayed during log collection processing. The debug screen 1101 is a screen including selection items, such as "1: debug log" "2: debug log (including initial log)" "3: initial log restart" "4: factory reset", and "5: end", and instruction buttons such as a "cancel" button and an "execute" button. The item "1: debug log" is an item for transferring the constant log 530 to the external storage device. The item "2: debug log (including initial log)" is an item for transferring each of the constant log 530 and the initial operation log 540 to the external storage device. The item "3: initial log restart" is an unselectable item in the first exemplary embodiment. This will be described in detail below in a second exemplary embodiment. The item "4: factory reset" is an item for performing reset processing in step S1402. The item "5: end" is an item for closing the debug screen 1101. The "cancel" button is a button for cancelling a selection state of a selected item. The "execute" button is a button for starting the execution of a selected item.

When the item "2" is selected on the debug screen 1101 and then the "execute" button is pressed, the transfer of log information, including the constant log 530 and the initial operation log 540, to the external storage device is started.

When the transfer of log information is instructed, the controller 110 first transfers the constant log 530 recorded on the constant log area 221 stored in the HDD 113 to the external storage device. Then, in step S1004, the controller 110 transfers the initial operation log 540 recorded on the initial operation log area 222 to the external storage device. After the transfer of log information is completed, in step S1005, the controller 110 updates an initial operation log collected flag stored in the HDD 113 to ON. Thus, the log collection processing from the image processing apparatus 100 is completed.

The first exemplary embodiment described above illustrates a case where writing of the initial operation log is started upon first power-on after reset processing, and the writing is stopped when the number of written initial operation logs reaches a storage capacity upper limit. A second exemplary embodiment illustrates a case where writing of the initial operation log is started at a timing different from the first power-on after reset processing. In the first exemplary embodiment, the initial operation log, as well as the system setting, the authentication setting, and the network setting are reset by the reset processing in step S1402. In the second exemplary embodiment, writing of the initial operation log is restarted while the system setting, the authentication setting, and the network setting are stored. The image processing apparatus 100 according to the second exemplary embodiment has a configuration similar to that of the first exemplary embodiment, except for a characteristic configuration of the second exemplary embodiment. Accordingly, the same components are denoted by the same reference numerals, and redundant descriptions thereof are omitted.

Figure 21:
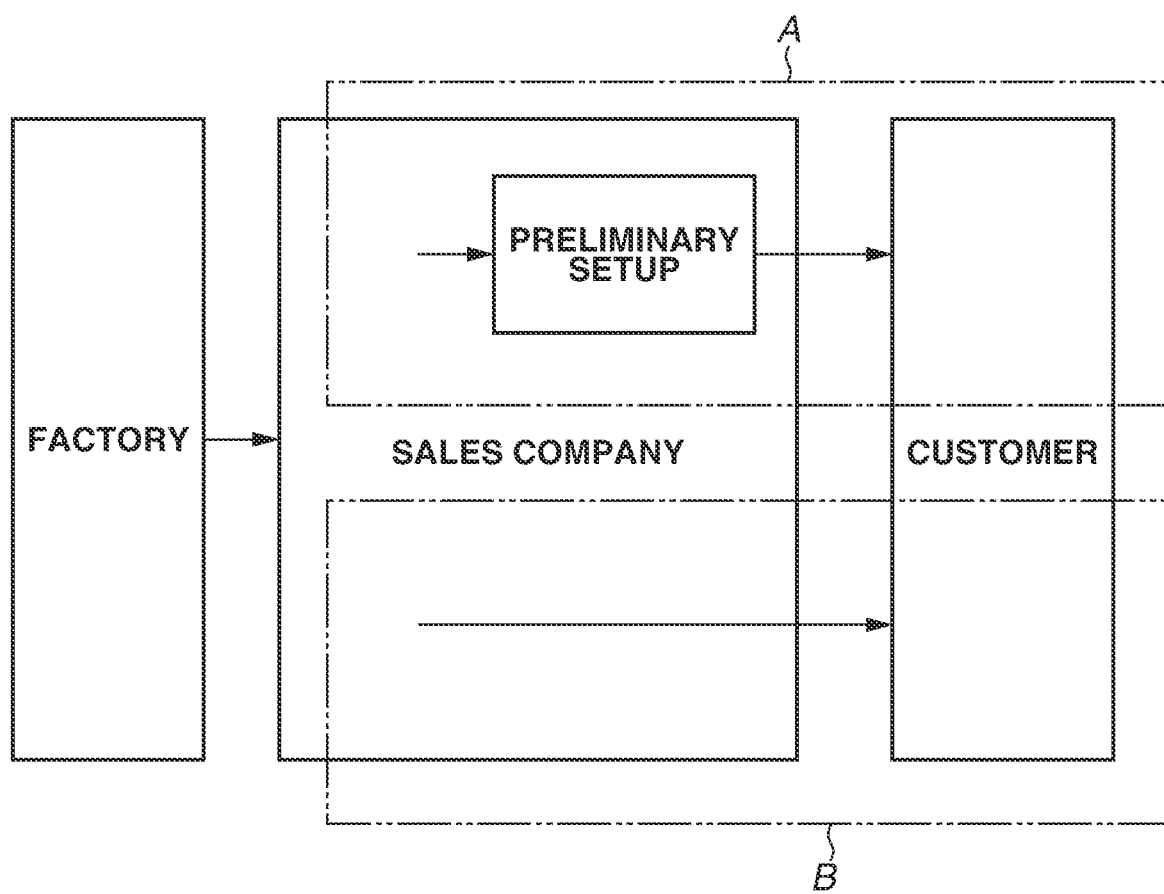
FIG. 21 is a diagram illustrating preliminary installation.

A route where a sales company delivers the image processing apparatus 100 to a customer will be described with reference to FIG. 21. Examples of a route where the image processing apparatus 100 is finally installed at the customer site include a case (B in FIG. 21) where the image processing apparatus 100 is directly delivered to the customer site from the sales company and installed at the customer site, and a case (A in FIG. 21) where various setup operations and adjustments are preliminarily carried out in response to a customer's request, and then the image processing apparatus 100 is delivered to the customer site and installed at the customer site. After that, "preliminary setup" which is performed on the route indicated by "A" in FIG. 21 is hereinafter referred to as "preliminary installation". The preliminary installation refers to an operation in which preliminary setup operations are performed at once on a plurality of image processing apparatuses 100 which is to be delivered to a customer site, so that the customer can use the image processing apparatuses 100 in a state desired by the customer immediately after the delivery. In the preliminary installation, a system setup operation, an authentication setting, a network setting, and the like are carried out in response to the customer's request in the sales company. At the same time, if a problem occurs in hardware or software during the preliminary installation, the sales company takes appropriate measures to solve the problem before installation of the image processing apparatus 100 at the customer site.

In the preliminary installation, as described above, various setup operations are carried out. Accordingly, after the various setup operations, the image processing apparatus 100 is shipped to the customer site without reset processing. This means that the image processing apparatus 100 is shipped in a state where the initial operation log 540 recorded during the preliminary installation is stored. In the preliminary installation, as the image processing apparatus 100 operates, the initial operation log area 222 is gradually occupied by data, and free space for recording operations to be performed after installation of the image processing apparatus 100 at the customer site that are intended to be recorded on the initial operation log is reduced. According to the present exemplary embodiment, the initial operation log area 222 is prevented from being occupied by data on an operation other than operations intended to be recorded during the preliminary installation.

<System>

Figure 20:
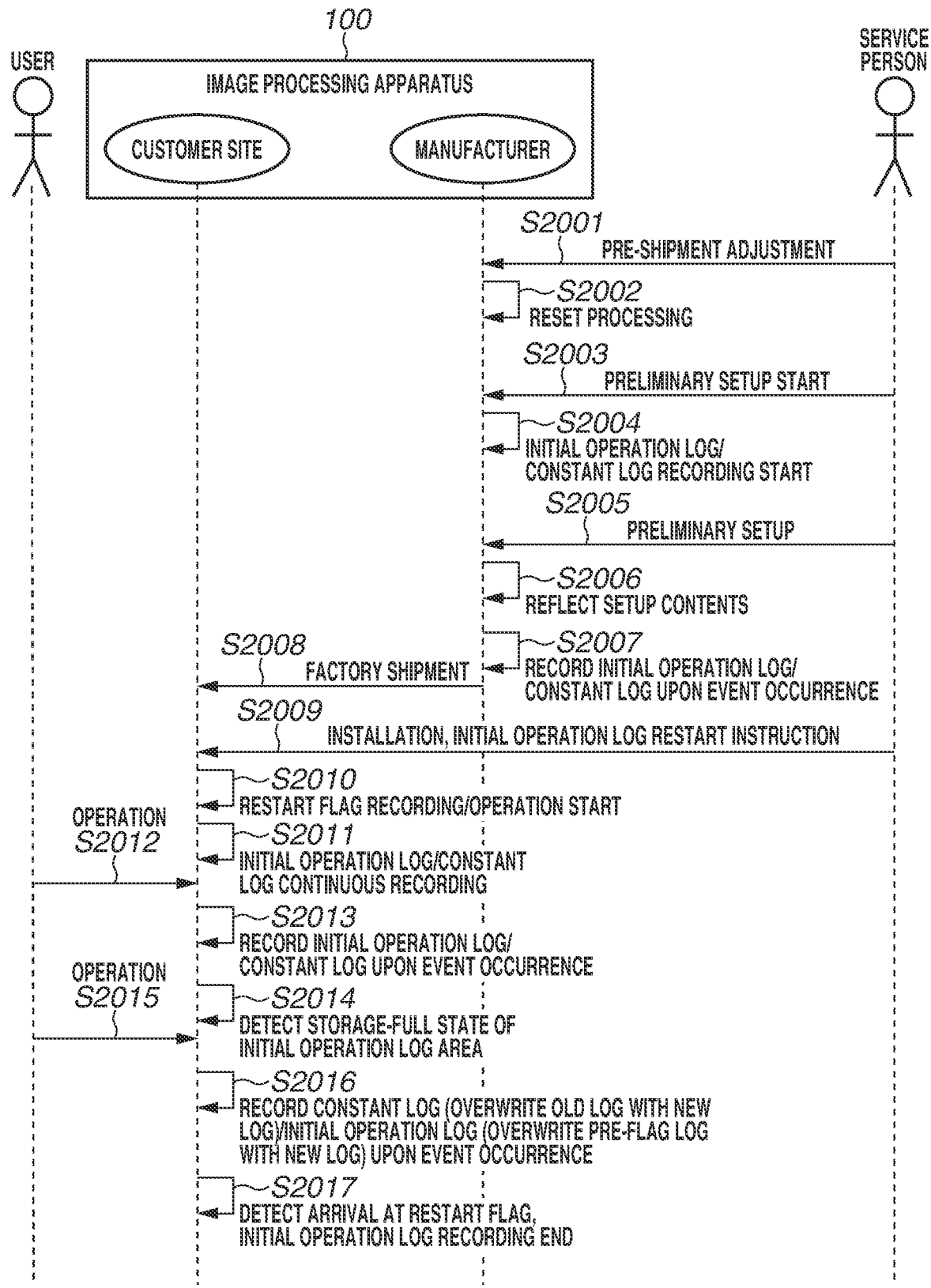
FIG. 20 is a diagram illustrating a system utilization sequence according to the second exemplary embodiment.

A use case of this system will now be described. This system is related to processes from shipment of the image processing apparatus 100 to recording of log information at a customer site. FIG. 20 illustrates a system utilization sequence.

In the case of shipping the image processing apparatus 100, in step S2001, a pre-shipment adjustment is first performed in a manufacturer's factory. At this stage, no failure occurs in the image processing apparatus 100. After the pre-shipment adjustment, in step S2002, the image processing apparatus 100 performs reset processing. In the reset processing, for example, a print count value counted up in test printing or the like during the pre-shipment adjustment is reset. Since the image processing apparatus 100 to be shipped is subjected to the preliminary setup operation, in step S2003, the service person starts the setup operation. Along with this operation, in step S2004, initial operation log/constant log recording is started. When the service person performs the preliminary setup operation in step S2005, in step S2006, the image processing apparatus 100 reflects instructed setup contents. During an event such as the setup contents reflection, in step S2007, the initial operation log and the constant log are recorded. After that, in step S2008, the image processing apparatus 100 is shipped to the customer site. In step S2009, installation processing is performed by the service person. In this process, the service person issues an initial operation log restart processing instruction. When the image processing apparatus 100 is normally installed, in step S2010, a restart flag is recorded and the image processing apparatus 100 starts operation. After the restart processing, in step S2011, initial operation log/constant log recording processing is continuously performed. After that, when various operations are performed by the user in step S2012, in step S2013, log information is added to the initial operation log and the constant log upon occurrence of an event. After that, when a certain number of logs are stored, in step S2014, the image processing apparatus 100 detects a storage full state of the initial operation log area 222. Then, in step S2015, various operations are performed by the user. In this example case, a failure occurs in the image processing apparatus 100. Since the initial operation log recording processing is stopped, in step S2016, the constant log and the initial operation log are recorded upon occurrence of an event. In this case, the old constant log 530 is overwritten with the new constant log 530 in the constant log area 221. The initial operation log 540 prior to the flag stored in step S2010 is overwritten with a new log. After that, the initial operation log 540 prior to the flag stored in step S2010 is continuously overwritten with a new log. When there is no log prior to the flag stored in step S2010, the image processing apparatus 100 terminates the initial operation log recording. The subsequent processing is like that described above with reference to FIG. 14, and accordingly redundant description thereof is omitted.

<Restart Processing>

Figure 15C:
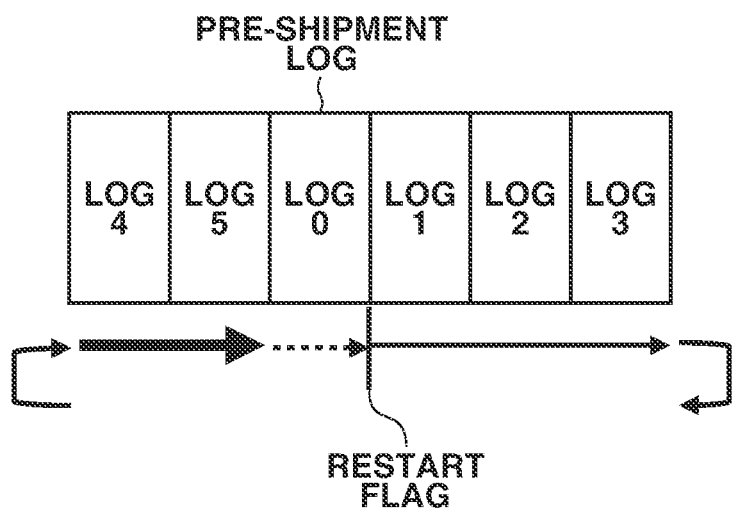
FIG. 15C is a diagram illustrating a method for recording an initial operation log according to a second exemplary embodiment.

In the present exemplary embodiment, the log output control unit 410 permits overwriting processing with a certain amount of data in the initial operation log area 222. Accordingly, write processing as illustrated in FIG. 15C is performed. Specifically, in a state where an area from the recording start point to a half point is occupied by a pre-shipment log 0 during the preliminary installation, when restart processing is accepted, a restart flag for setting the point as an initial operation log write reference point is stored. When the logs 1 to 3 are sequentially recorded and the constant log area 221 is occupied by a predetermined amount of data when there is no free space, or when a storage full state is detected), recording is restarted from the recording start point and the logs 4 and 5 are sequentially recorded by overwriting the pre-shipment log 0. After that, when all logs 0 are overwritten and the flag point is reached, the log output control unit 410 stops initial operation log writing. Since the logs prior to the flag point are overwritten with new logs, a sufficient number of initial operation logs 540 after the installation at the customer site can be corded.

To record a sufficient number of initial operation logs 540 after the installation of the image processing apparatus 100 at the customer site, the initial operation log area 222 may be cleared when the image processing apparatus 100 is restarted, and recording of initial operation logs 540 may be resumed from the recording start point. However, the configuration according to the present exemplary embodiment in which the pre-shipment log 0 is stored as long as possible is more beneficial. This is because, in a case where the image processing apparatus 100 is returned to the manufacturer when the initial operation logs 1 to 5 are recorded, information about the remaining pre-shipment logs 0 can be used as information in the investigation. That is, while the pre-shipment log 0 is not as important as the initial operation log 540, keeping the pre-shipment log 0 is more useful than deleting.

<Control Flow>

A storage status of the initial operation log area 222 and a control operation associated with restart processing will be described with reference to FIGS. 16, 17, 18, 19A, 19B, 19C, and 19D.

Figure 19A:
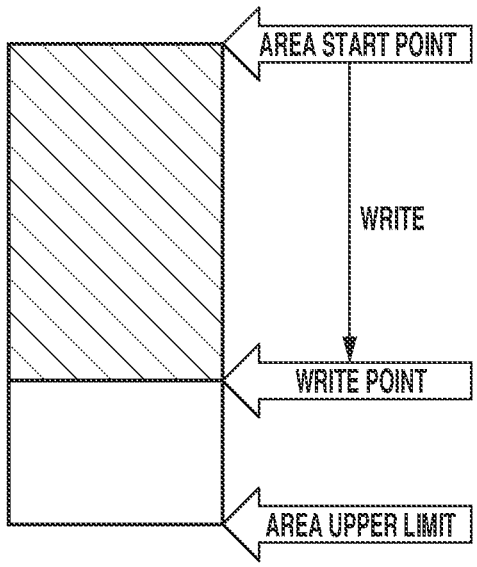
FIG. 19A is a diagram illustrates a storage area state.

When the preliminary installation is performed, a certain amount of log information is written into the initial operation log area 222. FIG. 19A illustrates a state of the initial operation log area 222 at preliminary installation.

Figure 19B:
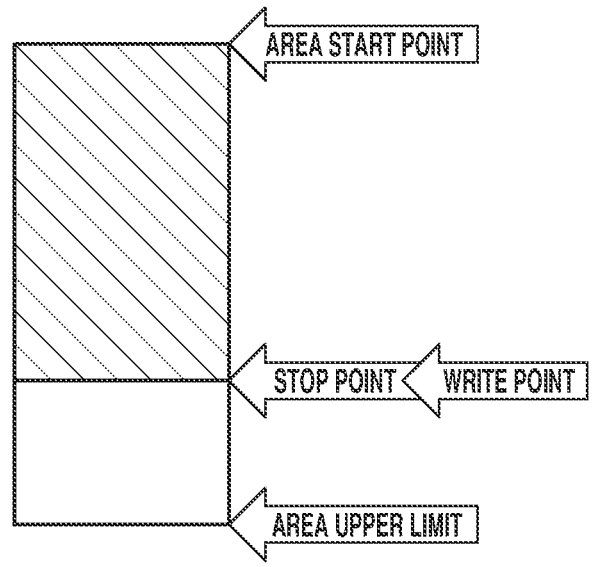
FIG. 19B is a diagram illustrating a storage area state.

The service person of the sales company operates the image processing apparatus 100 to restart the initial operation log. Upon the operation, in step S1801, the controller 110 displays the debug screen 1101. When the item "3" is continuously selected and the "executed" button is selected on the debug screen 1101, in step S1802, the controller 110 receives an input of an initial operation log restart instruction. In step S1803, the log output control unit 410 which has received the restart instruction initializes the initial operation log setting. In step S1804, the log output control unit 410 sets a stop point on an initial operation log storage area, which is an initial operation log stop condition, at a current write point position. FIG. 19B illustrates the initial operation log area 222 in a state where the processing in step S1804 is completed. 19B also illustrates a state of the initial operation log area 222 when the restart instruction is input. Next, in step S1805, the log output control unit 410 resets the initial operation log output setting to ON, and then the initial operation log restart processing ends. In the initial operation log reset processing, logs are continuously written using the storage area as a ring buffer, without deleting the recorded initial operation log.

Figure 16:
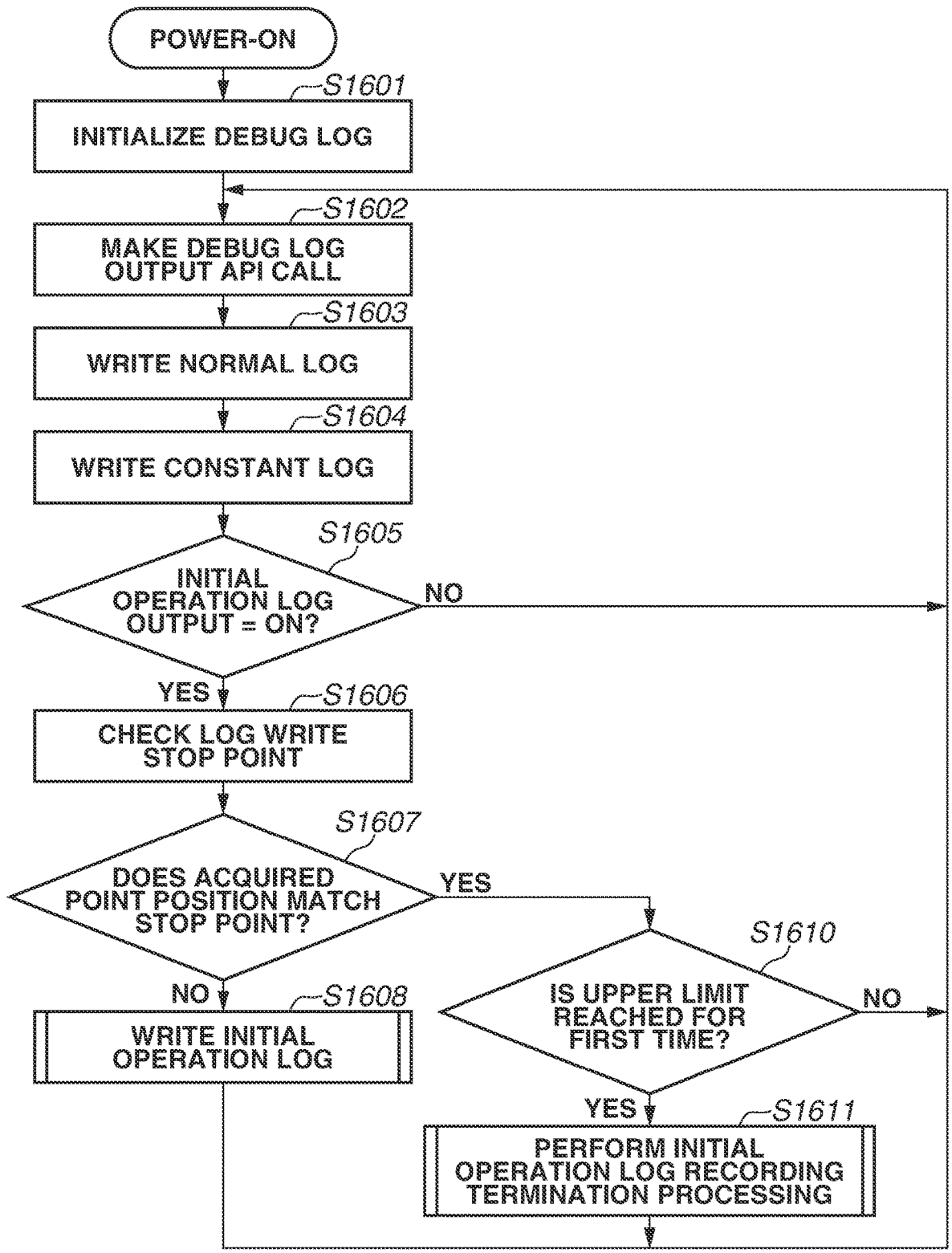
FIG. 16 is a flowchart illustrating log output processing after initial operation log restart processing.
Figure 17:
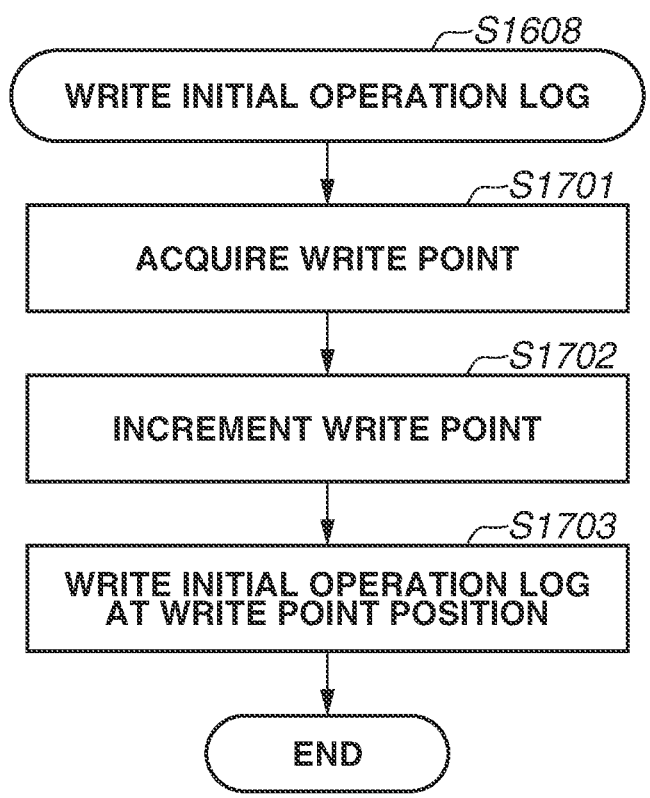
FIG. 17 is a flowchart illustrating initial operation log write processing.
Figure 18:
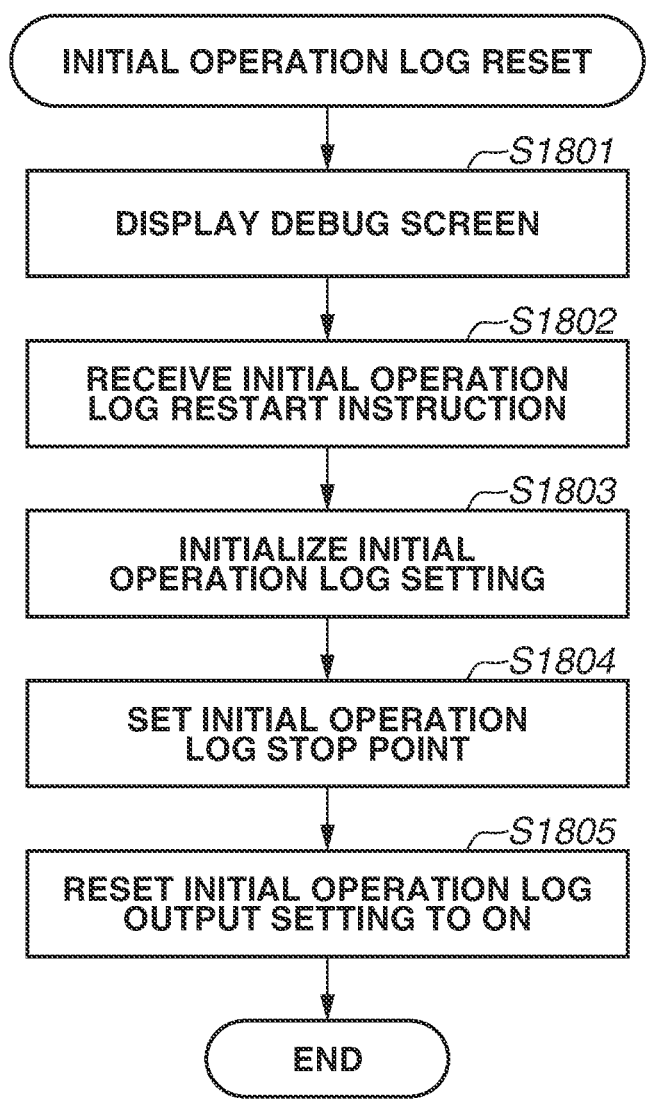
FIG. 18 is a flowchart illustrating initial operation log restart processing.
Figure 19C:
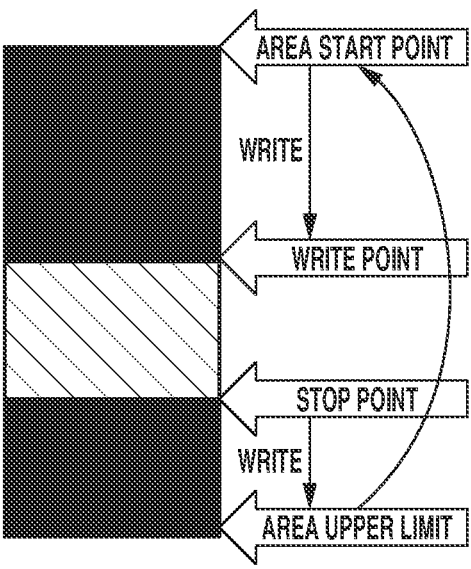
FIG. 19C is a diagram illustrating a storage area state 3.
Figure 19D:
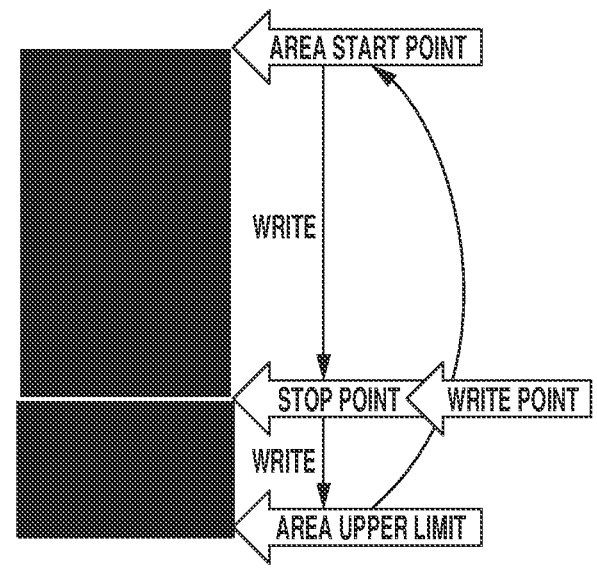
FIG. 19D is a diagram illustrating a storage area state 4.

Next, an initial operation log recording operation to be performed after operation restart processing will be described. After the initial operation log is restarted, the initial operation log storage area is in a state illustrated in FIG. 19B. When a debug log is output in accordance with the operation of the image processing apparatus 100, initial operation log stop determination and output processing are carried out based on a flowchart illustrated in FIG. 16. The flowchart illustrated in FIG. 16 is substantially the same as the flowchart of FIG. 9 described above in the first exemplary embodiment. Accordingly, only steps S1606, S1607, and S1608, which are different from the flowchart illustrated in FIG. 9, will be described. When the debug log is output, in step S1606, the controller 110 acquires a write point position for the initial operation log. In step S1607, the controller 110 compares the acquired point position with the stop point set in the reset processing in step S1804. In a case where the acquired point position matches the stop point, i.e., in a case where recording of the reset initial operation log has reached the end of the area (YES in step S1607), the processing proceeds to step S1610 to perform the initial operation log recording termination processing. The subsequent processing is similar to that of the first exemplary embodiment. In a case where the write point does not reach the stop position (NO in step S1607), the processing proceeds to step S1608 for initial operation log write processing. The processing in step S1608 will be described in detail with reference to a flowchart illustrated in FIG. 17. FIG. 17 is a flowchart illustrating the initial operation log write processing after operation restart processing. In step S1701, the controller 110 acquires a write point, and in step S1702, the controller 110 increments the write point. In step S1703, the controller 110 writes the initial operation log at the write point position. FIG. 19C illustrates a status where a certain number of initial operation logs obtained after reset processing are written (as indicated by a black area) and logs (as indicated by a shaded area) recorded before reset processing are overwritten and recorded. FIG. 19D illustrates a status of the initial operation log area in a state where the stop point is reached in step S1607. The write point matches the stop point, and the initial operation log storage area 222 is occupied by logs (as indicated by a black area) written after reset processing.

Other Embodiments

Figure 13:
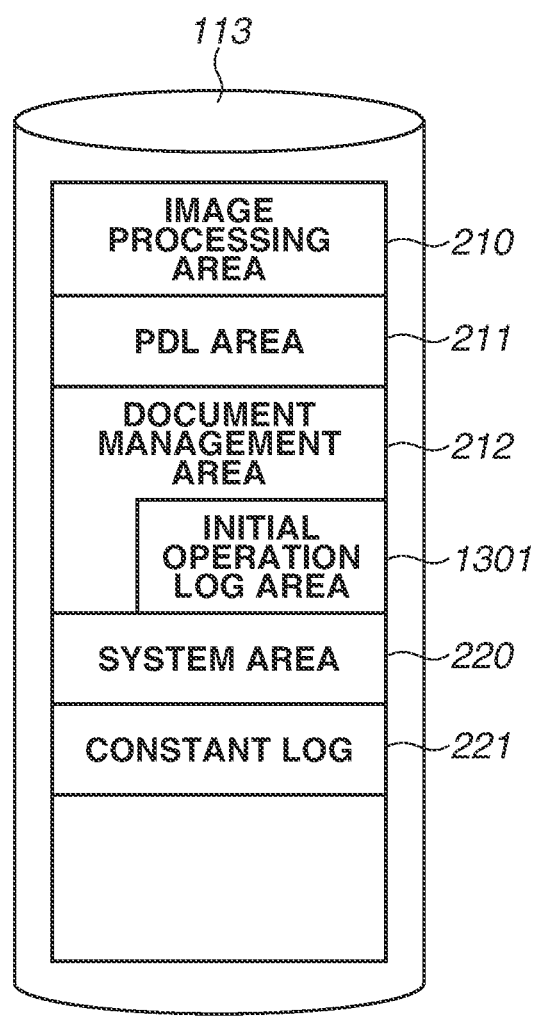
FIG. 13 is a diagram illustrating a storage area allocation configuration according to a modified example.

In the first exemplary embodiment, a dedicated area for storing the initial operation log is allocated to the HDD 113. However, the image processing apparatus 100 may store the initial operation log in an area which is also used as an area for recording information about other functions. FIG. 13 illustrates a modified example of the storage area allocation configuration. Referring to FIG. 13, an initial operation log area 1301 is allocated to the inside of the document management area 212 of the HDD 113. If this configurations employed, the initial operation log may be read out by the service person and then the area used as the initial operation log area 1301 may be returned to the document management area 212.

Embodiment(s) can also be realized by a computer of a system or apparatus that reads out and executes computer executable instructions (e.g., one or more programs) recorded on a storage medium (which may also be referred to more fully as a 'non-transit computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-225478, filed Nov. 30, 2018, which is hereby incorporated by reference herein in its entirety.

What is claimed is:

1. An information processing apparatus capable of outputting log information, the information processing apparatus comprising:
    a nonvolatile memory capable of storing the log information and having at least a first storage area, a second storage area, and a third storage area,
    wherein the first storage area is capable of overwriting old log information stored in the first storage area with new log information in a case where the first storage area reaches a full state, and the second storage area does not store new log information in a case where the second storage area reaches a full state with a plurality of pieces of log information, and
    a controller causing the nonvolatile memory to store the log information,
    wherein the controller is configured to:
    transmit log information generated based on start-up of the information processing apparatus to the first storage area and the second storage area,
    wherein in a case where the second storage area reaches the full state, stop transmitting log information to the second storage area and keep transmitting log information to the first storage area; and
    determine whether the second storage area reaches the full state before transmitting the log information to the second storage area,
    wherein in a case where the second storage area is determined to be in the full state, determine whether the determination of whether the second storage area reaches the full state has been made for the first time, and on the basis that the determination has been made for the first time, delete transmission setting of the log information to the second storage area, and
    wherein the controller is further configured to transmit the log information to the third storage area after deleting the transmission setting of the log information to the second storage area.

2. The information processing apparatus according to claim 1, wherein the plurality of pieces of log information is output by firmware.

3. The information processing apparatus according to claim 1, wherein storage of log information in the first storage area and the second storage area is started according to the first power-on after the shipment of the information processing apparatus.

4. The information processing apparatus according to claim 1, wherein the plurality of pieces of log information includes at least log information about an operating system (OS).

5. The information processing apparatus according to claim 1, wherein the plurality of pieces of log information includes at least log information about a user interface (UI).

6. The information processing apparatus according to claim 1, wherein the plurality of pieces of log information includes at least log information about a print function.

7. The information processing apparatus according to claim 1, wherein the plurality of pieces of log information includes at least log information about a scan function.

8. The information processing apparatus according to claim 1, wherein the plurality of pieces of log information includes at least time information.

9. The information processing apparatus according to claim 1, further comprising a print device configured to form an image on a sheet.

10. The information processing apparatus according to claim 1, further comprising a scan device configured to scan a document.

11. The information processing apparatus according to claim 1, further comprising an interface to which an external apparatus is connectable, and
wherein the controller is further configured to control the information processing apparatus to start in a safe mode in a state the external apparatus is connected to the interface, and, in a debugging function, the controller is capable of transmitting at least the plurality of pieces of log information stored in the second storage area to the external apparatus.

12. The information processing apparatus according to claim 1, wherein, when the information processing apparatus is started for the first time, the log information stored in the second storage area includes log generated during initialization of the information processing apparatus.

13. The information processing apparatus according to claim 1, further comprising a volatile memory which stores log information, and
wherein the controller is further configured to, in a case the volatile memory stores a predetermined amount of log information, transmit the predetermined amount of log information to at least one of the first storage area or the second storage area of the nonvolatile memory.

14. A method of controlling an information processing apparatus capable of outputting log information, the method comprising:
storing the log information and having at least a first storage area, a second storage area, and a third storage area, wherein the first storage area is capable of overwriting old log information stored in the first storage area with new log information in a case where the first storage area reaches a full state, and the second storage area does not store new log information in a case where the second storage area reaches a full state with a plurality of pieces of log information;
transmitting log information generated based on start-up of the information processing apparatus to the first storage area and the second storage area,
wherein in a case where the second storage area reaches the full state, stop transmitting log information to the second storage area and keep transmitting log information to the first storage area; and
determining whether the second storage area reaches the full state before transmitting the log information to the second storage area,
wherein in a case where the second storage area is determined to be in the full state, determine whether the determination of whether the second storage area reaches the full state has been made for the first time, and on the basis that the determination has been made for the first time, delete transmission setting of the log information to the second storage area, and
wherein the controller is further configured to transmit the log information to the third storage area after deleting the transmission setting of the log information to the second storage area.

15. The method according to claim 14, wherein the plurality of pieces of log information is output by firmware.

16. The method according to claim 14, wherein storage of log information in the first storage area and the second storage area is started according to the first power-on after the shipment of the information processing apparatus.

17. A non-transitory computer readable storage medium storing a program for causing a computer to execute a method of controlling an information processing apparatus capable of outputting log information, the method comprising:
storing the log information and having at least a first storage area, a second storage area, and a third storage area, wherein the first storage area is capable of overwriting old log information stored in the first storage area with new log information in a case where the first storage area reaches a full state, and the second storage area does not store new log information in a case where the second storage area reaches a full state with a plurality of pieces of log information;
transmitting log information generated based on start-up of the information processing apparatus to the first storage area and the second storage area,
wherein in a case where the second storage area reaches the full state, stop transmitting log information to the second storage area and keep transmitting log information to the first storage area; and
determining whether the second storage area reaches the full state before transmitting the log information to the second storage area,
wherein in a case where the second storage area is determined to be in the full state, determine whether the determination of whether the second storage area reaches the full state has been made for the first time, and on the basis that the determination has been made for the first time, delete transmission setting of the log information to the second storage area, and
wherein the controller is further configured to transmit the log information to the third storage area after deleting the transmission setting of the log information to the second storage area.

* * * * *